(12) United States Patent
Jinandra et al.

(10) Patent No.: US 12,521,880 B2
(45) Date of Patent: Jan. 13, 2026

(54) HUMAN MACHINE INTERFACE FOR ROBOTIC ARM OBJECT RECOVERY

(71) Applicant: Bastian Solutions, LLC, Indianapolis, IN (US)

(72) Inventors: Akash Madhu Jinandra, Boise, ID (US); Stephen Daniel Earl, Boise, ID (US); Dylan Rolleigh, Boise, ID (US); Makarand Shyam Mandolkar, Boise, ID (US)

(73) Assignee: Bastian Solutions, LLC, Indianapolis, IN (US)

( * ) Notice: Subject to any disclaimer, the term of this patent is extended or adjusted under 35 U.S.C. 154(b) by 139 days.

(21) Appl. No.: 18/484,934

(22) Filed: Oct. 11, 2023

(65) Prior Publication Data

US 2025/0121496 A1   Apr. 17, 2025

(51) Int. Cl.
  *B25J 9/16* (2006.01)
  *B25J 13/00* (2006.01)
  *B25J 13/06* (2006.01)

(52) U.S. Cl.
  CPC .......... *B25J 9/1653* (2013.01); *B25J 9/1697* (2013.01); *B25J 13/006* (2013.01); *B25J 13/06* (2013.01)

(58) Field of Classification Search
  CPC ...... B25J 9/1653; B25J 9/1697; B25J 13/006; B25J 13/06; B25J 9/1674
  See application file for complete search history.

(56) References Cited

U.S. PATENT DOCUMENTS

| | | | |
|---|---|---|---|
| 9,609,283 B2 | 3/2017 | Fernandez et al. | |
| 9,669,543 B1 * | 6/2017 | Stubbs | B25J 9/1612 |
| 10,360,531 B1 * | 7/2019 | Stallman | G06Q 10/087 |
| 10,521,626 B2 | 12/2019 | Hamer et al. | |
| 11,325,782 B2 | 5/2022 | Avraham | |
| 2017/0136632 A1 | 5/2017 | Wagner et al. | |
| 2020/0095001 A1 | 3/2020 | Menon et al. | |
| 2021/0069898 A1 | 3/2021 | Duan et al. | |
| 2021/0188554 A1 * | 6/2021 | Kalouche | B07C 3/08 |

* cited by examiner

*Primary Examiner* — Dylan M Katz
(74) *Attorney, Agent, or Firm* — Woodard, Emhardt, Henry, Reeves & Wagner LLP

(57) ABSTRACT

An automated material handling system includes a robot configured to handle one or more items and an operator device. The robot is configured to send an alert to the operator device in response to a fault by the robot in handling at least one of the items. The robot is configured to receive instructions from the operator device. The robot is configured to remedy the fault based on the instructions. A camera configured to capture an image of the fault in handling the items by the robot, and the robot is configured to send the image of the fault to the operator device with the alert.

15 Claims, 16 Drawing Sheets

HUMAN MACHINE INTERFACE FOR ROBOTIC ARM OBJECT RECOVERY

BACKGROUND

Robots are commonly implemented to perform routine, boring, and/or dangerous tasks such as for stacking or unstacking items in a warehouse or manufacturing plant. Due to their strength, speed, and other characteristics, which can cause harm to humans, most robots are segregated or quarantined from directly interacting with humans. As a practical matter, maintaining a safe and productive work environment around robots can be quite difficult. Thus, there is a need for improvement in this field.

SUMMARY

System uptime is always a concern with automated material handling systems like robotic equipment. Faults, such as dropping objects or other items, commonly occur. When such faults occur, a human usually has to enter the work area of the robotic equipment to pick up the dropped item or take some other physical corrective action to address the situation. Having a human enter this work area of the equipment can be quite dangerous, and as a result, safety precautions must be taken which can lead to further downtime. Before entering the physical workspace of the robot, the robot for example is typically powered off or otherwise locked down. While locked down, the robot is generally unable to move so as to reduce the chance of injury. After the human leaves the workspace of the robot, the robot can then be reactivated to perform the material handling tasks. However, this process can waste a considerable amount of time.

A unique automated material handling system has been developed to handle such faults as well as other issues during the material handling process. The system is adapted for a wide variety of use cases. For instance, the system can be used to handle faults with robot arms that are configured to pick and place items. The system can also handle faults in trailer packing/unpacking systems (e.g., the ULTRA BLUE® robotic system). The system is designed to handle the faults without human physical intervention so that a human does not need to enter the work area of the automated equipment.

One common fault source is an inability of the equipment to locate a particular object. The system is able to receive the location of the object from a human operator, and as a result, the equipment is then able to quickly locate the object. In one particular example, a robot may drop an object, and a human operator through a picture or video interface may identify the location where the object was dropped such that the robot is able to pick up the object. The human may also identify a pickable surface of the object where the robot is able to grab the object such as via suction cups. In other words, the system has several capabilities such as handling failures to receive pick points of items in a tote, dropped item recovery, and user controlled custom pick point selection which allows a user to specify a unique surface feature as the target pick point outside the center of the target item.

The human operator is able to handle these faults and other issues via a remote workstation, such as a computer or even a mobile phone. In one form, the remote workstation displays a picture or video of the work area of the automated equipment. The remote workstation has a human interactive interface that allows the human operator to fix most faults remotely. In one form, the human interactive interface includes a touch interface configured to be touched by a human operator to identify a location of an object that is sent to the robotic equipment. In one example, the touch interface allows the human operator to identify a pickable surface on the object that is sent to the equipment.

The system and techniques as described and illustrated herein concern a number of unique and inventive aspects. Some, but by no means all, of these unique aspects are summarized below.

Aspect 1 generally concerns a system.

Aspect 2 generally concerns the system of any previous aspect including a network.

Aspect 3 generally concerns the system of any previous aspect including a material management system.

Aspect 4 generally concerns the system of any previous aspect in which the material management system includes an Artificial Intelligence (AI) system.

Aspect 5 generally concerns the system of any previous aspect in which the AI system enables the robot to recognize the items.

Aspect 6 generally concerns the system of any previous aspect in which the AI system is configured to recognize the items through machine learning.

Aspect 7 generally concerns the system of any previous aspect in which the AI system is configured to determine edge lines of the items.

Aspect 8 generally concerns the system of any previous aspect in which the AI system is configured to determine surfaces of the items.

Aspect 9 generally concerns the system of any previous aspect in which the material management system is operatively coupled to the network.

Aspect 10 generally concerns the system of any previous aspect including a robot.

Aspect 11 generally concerns the system of any previous aspect in which the robot is configured to handle one or more items.

Aspect 12 generally concerns the system of any previous aspect including a camera.

Aspect 13 generally concerns the system of any previous aspect in which the camera is configured to capture an image of the fault in handling the items by the robot.

Aspect 14 generally concerns the system of any previous aspect in which the fault includes an inability of the robot to handle one of the items.

Aspect 15 generally concerns the system of any previous aspect in which the items include a difficult item.

Aspect 16 generally concerns the system of any previous aspect in which the fault includes an inability of the robot to pick one of the items.

Aspect 17 generally concerns the system of any previous aspect in which the fault includes an inability of the robot to place one of the items.

Aspect 18 generally concerns the system of any previous aspect in which the fault includes the robot dropping a dropped item.

Aspect 19 generally concerns the system of any previous aspect in which the items include a dropped item.

Aspect 20 generally concerns the system of any previous aspect in which the fault includes an inability of the robot to discern which of the items to handle.

Aspect 21 generally concerns the system of any previous aspect in which the robot is configured to send an alert to the operator device in response to a fault by the robot in handling at least one of the items.

Aspect 22 generally concerns the system of any previous aspect in which the camera is configured to send an alert for the fault to the operator device.

Aspect 23 generally concerns the system of any previous aspect in which the robot is configured to send the image of the fault to the operator device with the alert.

Aspect 24 generally concerns the system of any previous aspect in which the alert includes a web page.

Aspect 25 generally concerns the system of any previous aspect in which the web page includes an image section that includes the image of the fault.

Aspect 26 generally concerns the system of any previous aspect in which the web page includes a text section with information about the fault.

Aspect 27 generally concerns the system of any previous aspect in which the alert includes an image section that includes the image of the fault.

Aspect 28 generally concerns the system of any previous aspect in which the image section includes edge lines outlining edges of the items.

Aspect 29 generally concerns the system of any previous aspect in which the image section includes edge lines outlining edges of the items to demarcate surfaces of the items.

Aspect 30 generally concerns the system of any previous aspect in which the fault includes an inability of the robot to engage a surface of a difficult item.

Aspect 31 generally concerns the system of any previous aspect in which the camera is configured to capture an image of the items.

Aspect 32 generally concerns the system of any previous aspect in which the camera operatively connected to the robot.

Aspect 33 generally concerns the system of any previous aspect in which the robot includes the camera.

Aspect 34 generally concerns the system of any previous aspect in which the robot has a robot workspace.

Aspect 35 generally concerns the system of any previous aspect in which the operator device is located at a remote location relative to the robot.

Aspect 36 generally concerns the system of any previous aspect in which the operator device is located outside of the robot workspace.

Aspect 37 generally concerns the system of any previous aspect in which the remote location is outside of the robot workspace.

Aspect 38 generally concerns the system of any previous aspect in which the robot is operatively coupled to the network.

Aspect 39 generally concerns the system of any previous aspect in which the robot is a robot arm.

Aspect 40 generally concerns the system of any previous aspect in which the robot is a gantry style robotic vehicle.

Aspect 41 generally concerns the system of any previous aspect in which the robot is a robotic shuttle.

Aspect 42 generally concerns the system of any previous aspect in which the robot is a robotic mast vehicle.

Aspect 43 generally concerns the system of any previous aspect in which the robot is configured to load and/or unload the items from a trailer.

Aspect 44 generally concerns the system of any previous aspect including an operator device.

Aspect 45 generally concerns the system of any previous aspect in which the operator device includes an input device.

Aspect 46 generally concerns the system of any previous aspect in which the operator device includes an output device.

Aspect 47 generally concerns the system of any previous aspect in which the operator device includes an input/output (I/O) device.

Aspect 48 generally concerns the system of any previous aspect in which the I/O device includes a touchscreen.

Aspect 49 generally concerns the system of any previous aspect in which the I/O device includes a keyboard.

Aspect 50 generally concerns the system of any previous aspect in which the operator device includes a display configured to display the image of the fault.

Aspect 51 generally concerns the system of any previous aspect in which the display is a touchscreen.

Aspect 52 generally concerns the system of any previous aspect in which the operator device include a computer.

Aspect 53 generally concerns the system of any previous aspect in which the operator device includes a mobile device.

Aspect 54 generally concerns the system of any previous aspect in which the operator device include a smartphone.

Aspect 55 generally concerns the system of any previous aspect in which the operator device is operatively coupled to the network.

Aspect 56 generally concerns the system of any previous aspect in which the operator device is configured to receive instructions from a human operator on how to remedy the fault.

Aspect 57 generally concerns the system of any previous aspect in which the instructions include which of the items to pick.

Aspect 58 generally concerns the system of any previous aspect in which the alert includes the image of the fault to the operator device.

Aspect 59 generally concerns the system of any previous aspect in which the instructions include which surface of the items to engage with the robot.

Aspect 60 generally concerns the system of any previous aspect in which the instructions include picking up a dropped item with the robot.

Aspect 61 generally concerns the system of any previous aspect in which the touchscreen is configured to receive a touch-based input as to which of the items to handle with the robot.

Aspect 62 generally concerns the system of any previous aspect in which the touchscreen is configured to receive a touch-based input as to which surface of a difficult item to engage with the robot.

Aspect 63 generally concerns the system of any previous aspect in which the operator device is configured to send the instruction to the robot.

Aspect 64 generally concerns the system of any previous aspect in which the operator device is configured to send the instruction to the robot over the network.

Aspect 65 generally concerns the system of any previous aspect in which the material management system is configured to relay the alert.

Aspect 66 generally concerns the system of any previous aspect in which the material management system is configured to relay the instructions.

Aspect 67 generally concerns the system of any previous aspect in which the robot is configured to receive instructions from the operator device.

Aspect 68 generally concerns the system of any previous aspect in which the robot is configured to remedy the fault based on the instructions.

Aspect 69 generally concerns the system of any previous aspect in which the robot is configured to handle at least one of the items based on the instructions.

Aspect 70 generally concerns the system of any previous aspect in which the robot is configured to pick up one of the items designated in the instructions.

Aspect 71 generally concerns the system of any previous aspect in which the robot is configured to engage the surface of the difficult item that was designated in the instructions.

Aspect 72 generally concerns the system of any previous aspect in which the robot is configured to pick up the dropped item based on the instructions.

Aspect 73 generally concerns the system of any previous aspect in which the operator device is operated by a human being.

Aspect 74 generally concerns the system of any previous aspect including an automated material handling system.

Aspect 75 generally concerns the system of any previous aspect in which the automated material handling system is configured to handle one or more faults during material handling.

Aspect 76 generally concerns the system of any previous aspect in which the automated material handling system is configured to handle the faults without human physical intervention.

Aspect 77 generally concerns the system of any previous aspect in which the faults include an inability of the automated material handling system to locate an object.

Aspect 78 generally concerns the system of any previous aspect in which the automated material handling system is configured to receive the location of the object from a human operator.

Aspect 79 generally concerns the system of any previous aspect in which the faults include the automated material handling system dropping an object.

Aspect 80 generally concerns the system of any previous aspect in which the automated material handling system is configured to pick up the object that was dropped upon receiving the location of the object from a human operator.

Aspect 81 generally concerns the system of any previous aspect in which the faults include an inability of the automated material handling system to find a pickable surface.

Aspect 82 generally concerns the system of any previous aspect in which the automated material handling system is configured to pick from the pickable surface upon receiving the location of the pickable surface from a human operator.

Aspect 83 generally concerns the system of any previous aspect in which the automated material handling system is configured to handle the faults from a remote workstation that is remote from the automated material handling system.

Aspect 84 generally concerns the system of any previous aspect in which the remote workstation is configured to display a video of a work area of the automated material handling system.

Aspect 85 generally concerns the system of any previous aspect in which the remote workstation is configured to provide a human interactive interface that allows fixing of the faults.

Aspect 86 generally concerns the system of any previous aspect in which the human interactive interface includes a touch interface configured to be touched by a human operator to identify a location of an object that is sent to the automated material handling system.

Aspect 87 generally concerns the system of any previous aspect in which the touch interface is configured to allow the human operator to identify a pickable surface on the object that is sent to the automated material handling system.

Aspect 88 generally concerns the system of any previous aspect in which the remote workstation includes a computer.

Aspect 89 generally concerns the system of any previous aspect in which the remote workstation includes a mobile phone.

Aspect 90 generally concerns the system of any previous aspect in which the automated material handling system includes a robot arm configured to pick and place items.

Aspect 91 generally concerns the system of any previous aspect in which the automated material handling system includes a trailer packing or unpacking system.

Aspect 92 generally concerns a method.

Aspect 93 generally concerns the method of any previous aspect including determining a fault in handling of one or more items has occurred at a robot with a controller.

Aspect 94 generally concerns the method of any previous aspect including capturing an image of the fault with a camera.

Aspect 95 generally concerns the method of any previous aspect including sending the image from the controller to an operator device.

Aspect 96 generally concerns the method of any previous aspect including displaying the image on the operator device.

Aspect 97 generally concerns the method of any previous aspect including receiving an instruction to remedy the fault from a human operator with the operator device.

Aspect 98 generally concerns the method of any previous aspect including sending the instruction from the operator device to the controller of the robot.

Aspect 99 generally concerns the method of any previous aspect including remedying the fault with the robot based on the instruction.

Aspect 100 generally concerns the method of any previous aspect including picking up the dropped item with the robot.

Aspect 101 generally concerns the method of any previous aspect in which the fault includes an inability of the robot to engage a difficult item.

Aspect 102 generally concerns the method of any previous aspect in which the instruction includes a designation of a surface of the difficult item to engage.

Aspect 103 generally concerns the method of any previous aspect including engaging the surface of the difficult item with the robot.

Aspect 104 generally concerns the method of any previous aspect including receiving a touch input on a touchscreen of the operator device at a location corresponding to the surface of the difficult item in the image.

Aspect 105 generally concerns the method of any previous aspect including receiving a touch input on a touchscreen display of the operator device at a location corresponding to a selected item in the image.

Aspect 106 generally concerns the method of any previous aspect including handling the selected item with the robot.

Aspect 107 generally concerns the method of any previous aspect including displaying edge lines around edges of the items in the image.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
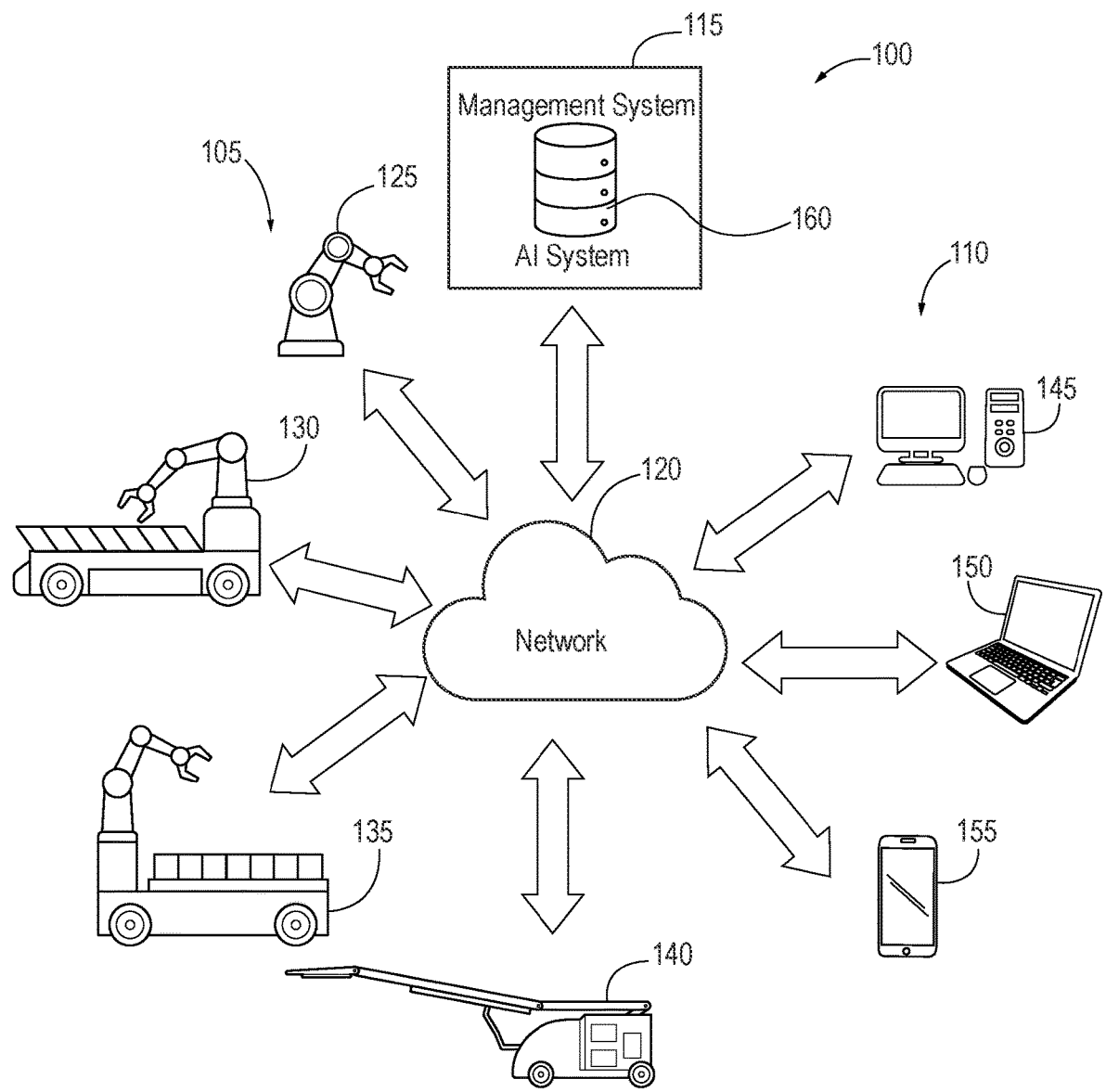
FIG. 1 is a block diagram of an automated material handling system according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a block diagram of an automated material handling system 100 according to one example. The system 100 is designed to handle items and other objects in a wide variety of material handling environments such as in manufacturing plants and warehouses. As shown, the system 100 includes one or more robots 105, one or more operator devices 110, and at least one material handling management system 115. The robots 105, the operator devices 110, and the material handling management system 115 are operatively coupled to one another so as to communicate with one another through a network 120 like an intranet, an extranet (e.g., the Internet), and/or other types of networks. In one example, the network 120 is at least in part a private internal network used within a warehouse facility, and the robots 105, operator devices 110, and material handling management system 115 are operatively connected to the network 120 through wired and/or wireless connections. In other examples, at least part of the network 120 includes a public network, such as a cellular network, that is located outside of the warehouse facility.

The robots 105 are designed to handle items such as in warehouses and in manufacturing environments. For instance, the robots 105 can be used to stack, unstack, pick, place, move, and/or transport items like boxes, cartons, bags, bottles, containers, pallets, and other objects. Some example use cases for the robots 105 can include bin picking, depalletizing, and semi-trailer loading/unloading. The robots 105 can include a wide variety of different types of robots. For instance, the robots 105 in the FIG. 1 example include a robot arm 125, a gantry style robotic vehicle 130, a robotic shuttle 135, and a robotic mast vehicle 140. The gantry style robotic vehicle 130, robotic shuttle 135, and robotic mast vehicle 140 are each in the form of an autonomous mobile unit (AMU) that is able to independently move and handle items. The robot arm 125 is sometimes used in pick to order environments, such as for online order fulfillment, and the gantry style robotic vehicle 130 is used in batch picking environments. The robotic shuttle 135 is commonly used in autonomous storage and retrieval (ASR) systems, and the robotic mast vehicle 140 is mostly used to load and unload trailers. It should be recognized that the robots 105 can include other types of robots, such as robotic forklift trucks, and/or different combinations of robots. In some use cases, all of the robots 105 are the same type within a facility.

Occasionally, the robots 105 may not be able to handle an item or may even drop an item. Traditionally, the robot needed to be powered down or otherwise locked down before the human operator was allowed to physically enter the workspace of the robot 105 so as to take corrective action. For example, the robot 105 would be shut down so that the human operator could enter the robotic workspace so as to pick up a dropped item or repack a bin of items. The time wasted in locking down and restarting the robot reduced operational efficiency. Moreover, having the human operator physically enter the workspace of the robot 105 can still be dangerous, and each time the human operator enters the workspace, there is a chance that the human operator may accidentally damage the robot 105 and/or otherwise disrupt the operation of the robot 105. Through the operator device 110 human operators are able to remotely intervene and guide the robot 105 to take appropriate corrective action without physically entering the workspace of the robot 105.

The operator device 110 can come in a wide variety of forms and can include a wide variety of computer and other computing devices. For instance, the operator devices 110 in the depicted example include a desktop computer 145, a laptop computer 150, and a mobile device 155. The operator devices 110 in a particular implementation can be different or the same type of computing device. Other types and combinations of computers can function as the operator devices 110 in other examples.

The material handling management system 115 is configured to control the overall operation of the robots 105 in the system 100. In the illustrated example, the material handling management system 115 includes an artificial intelligence system (AI system) 160 that is configured to train the robots 105 to identify and handle items. During operation, the AI system 160 in one variation is configured to return to the robot 105 a ranked order list of six degrees of freedom (6DOF) poses which is then used by the robot 105 to select and handle the items. In other examples, the robots 105 partially or fully include the AI system 160 so that the AI system 160 operates locally.

Figure 2:
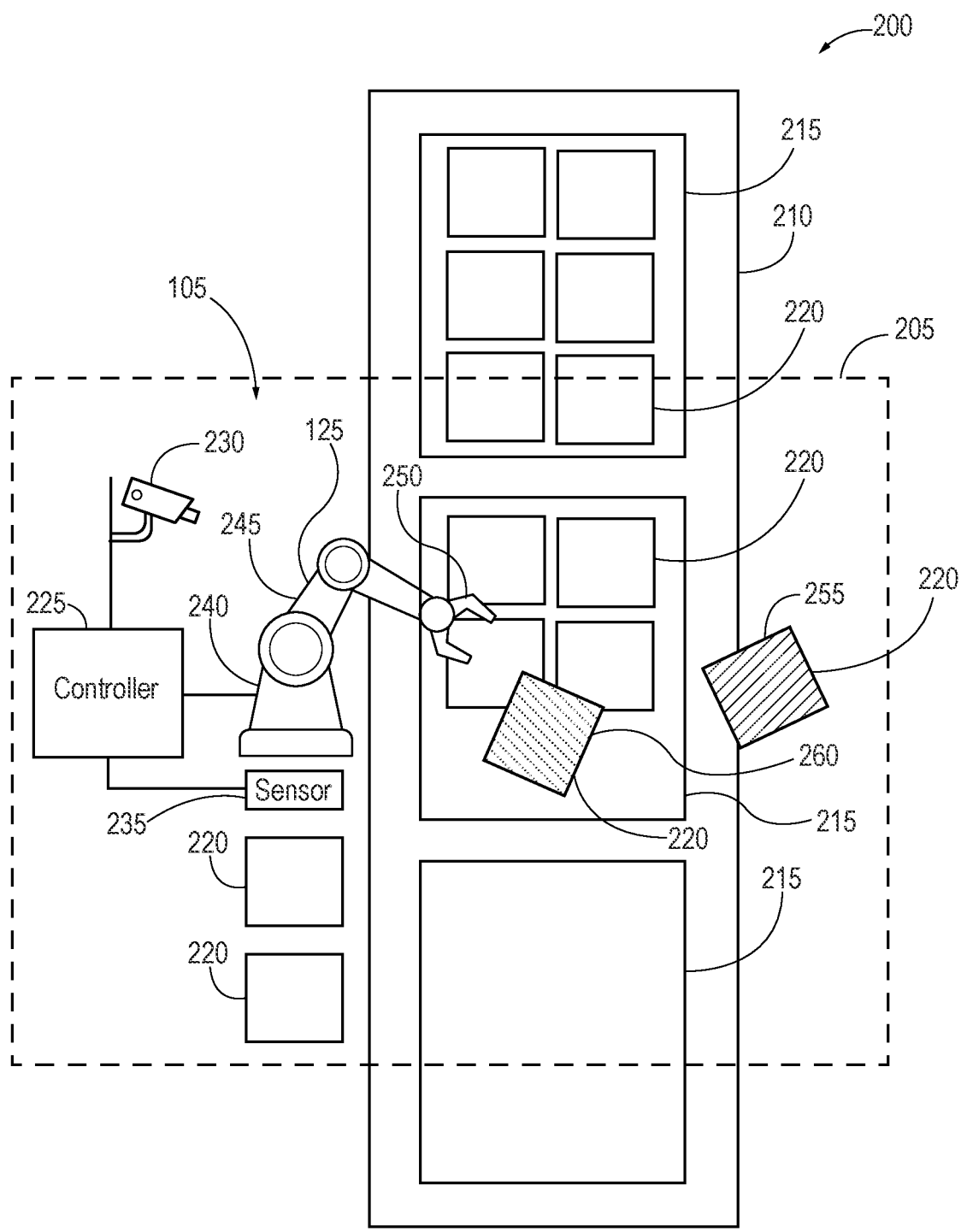
FIG. 2 is a block diagram of an example of a robot station that can operate in the FIG. 1 system.

FIG. 2 shows one example of a robot station 200 where the robot 105 operates. It should be recognized that the robot station 200 in other examples can be configured differently than is shown. In the illustrated example, the robot 105 is a robot arm 125, but it should be recognized that other types of robots can be used in other examples such as those described above with respect to FIG. 1 (e.g., the gantry style robotic vehicle 130, robotic shuttle 135, and robotic mast vehicle 140). As shown, the robot 105 operates within a robot workspace 205. Generally, the robot workspace 205 is where humans are prohibited to enter for safety and other purposes while the robot 105 is operating. The robot workspace 205 in certain versions comes in the form of physical barriers such as gates, rails, cages, walls, and the like. In other versions, the robot workspace 205 can take a virtual form such as by using light curtains or other sensors that sense human presence and stop the operation of the robot 105. In still yet other variations, the robot workspace 205 is just an indicator where the robot 105 operates. For instance, the robot workspace 205 may be denoted by signs, painted lines on the floor, alarms, and the like. As should be appreciated, a combination of these or other approaches may be used to mark the robot workspace 205 or not, if so desired. In other examples, such as when a facility is fully automated, no demarcations or other signifiers are used to represent the robot workspace 205.

In the illustrated example, the robot station 200 includes a conveyor 210 on which one or more bins 215 are transported. The bins 215 contain one or more items 220 that are handled by the robot 105. In one form, the robot 105 picks the item 220 from the bins 215 for order fulfillment shipping or other purposes, and in other forms, the robot 105 places the items 220 into the bins 215. When describing this system 100, the term "remote" generally refers to a location outside of the robot workspace 205 where a human operator is unable to physically interact with the robot 105, bins 215, and/or items 220 being handled by the robot 105 such that human operator is unable to physically remedy an issue with the robot 105 and/or the items 220 being handled.

The robot 105 in this example includes a controller 225 that controls the operation of the robot 105 and one or more cameras 230 operatively connected to the controller 225. In one form, the controller 225 is operatively connected to the network 120 so as to communicate with the operator devices 110, the material handling management system 115, and even other robots 105. The robot 105 in the depicted example further includes one or more sensors 235 that are operatively connected to the controller 225. The sensors 235 are configured to sense a variety of conditions relating the robot 105 and/or the items 220. For instance, the sensor 235 in one version is in the form of a proximity sensor or light sensor that senses the presence and/or location of the bins 215 as the bins 215 travel along the conveyor 210. In another version, the sensor 235 includes a vacuum sensor in the robot 105 that determines whether a proper vacuum was drawn which would be indicative of whether the robot 105 is holding the item 220 with a vacuum or suction cup.

Again, the robot 105 in FIG. 2 is in the form of the robot arm 125 for mainly explanation purposes. Other types of robots can be used in other environments. As will be appreciated, one unique aspect is that the system 100 and associated techniques can be used in a wide variety of robotic environments. The robot arm 125 in the depicted example includes a base 240, an arm 245 coupled to the base 240, and an end effector 250 connected to one end of the arm 245. The end effector 250 is configured to secure the items 220 to the robot arm 125. For instance, the end effector 250 can include one or more vacuum cups that secure the items 220 via suction and/or one or more gripper fingers that grasp the items 220.

As shown, the robot 105 sometimes drops the item 220 on the floor, the conveyor 210, or elsewhere such that the item 220 is designated a dropped item 255. For such dropped items 255, traditional robot systems would require a human operator to physically intervene and pick up or otherwise deal with the dropped item 255. The robot 105 may also occasionally find one of the items 220 difficult to pick up or hold, and such item 220 would be designated a difficult item 260. For instance, the robot 105 may unsuccessfully attempt to pick up the difficult item 260 which can be sensed by the camera 230 and/or the sensor 235, and at other times, the robot 105 is unable to discern the surface where the end effector 250 is to grasp the difficult item 260 or even which item 220 to grasp. When these issues occur, the controller 225 sends an alert or signal directly to the operator device 110 or indirectly to the operator device 110 through the material handling management system 115 requesting assistance. Based on the images and/or video from the camera 230 of the robot 105, the human operator is able to remotely provide instructions to the robot 105 so as to take corrective actions. For example, the human operator can instruct the robot 105 where to pick up the dropped item 255 and/or where to grasp the difficult item 260 with the end effector 250. With the human operator being able to remotely diagnose and remedy the issue outside of the robot workspace 205, the robot station 200 experiences shorter downtimes, and the human operator is able to safely supervise more robots 105 with less effort.

Figure 3:
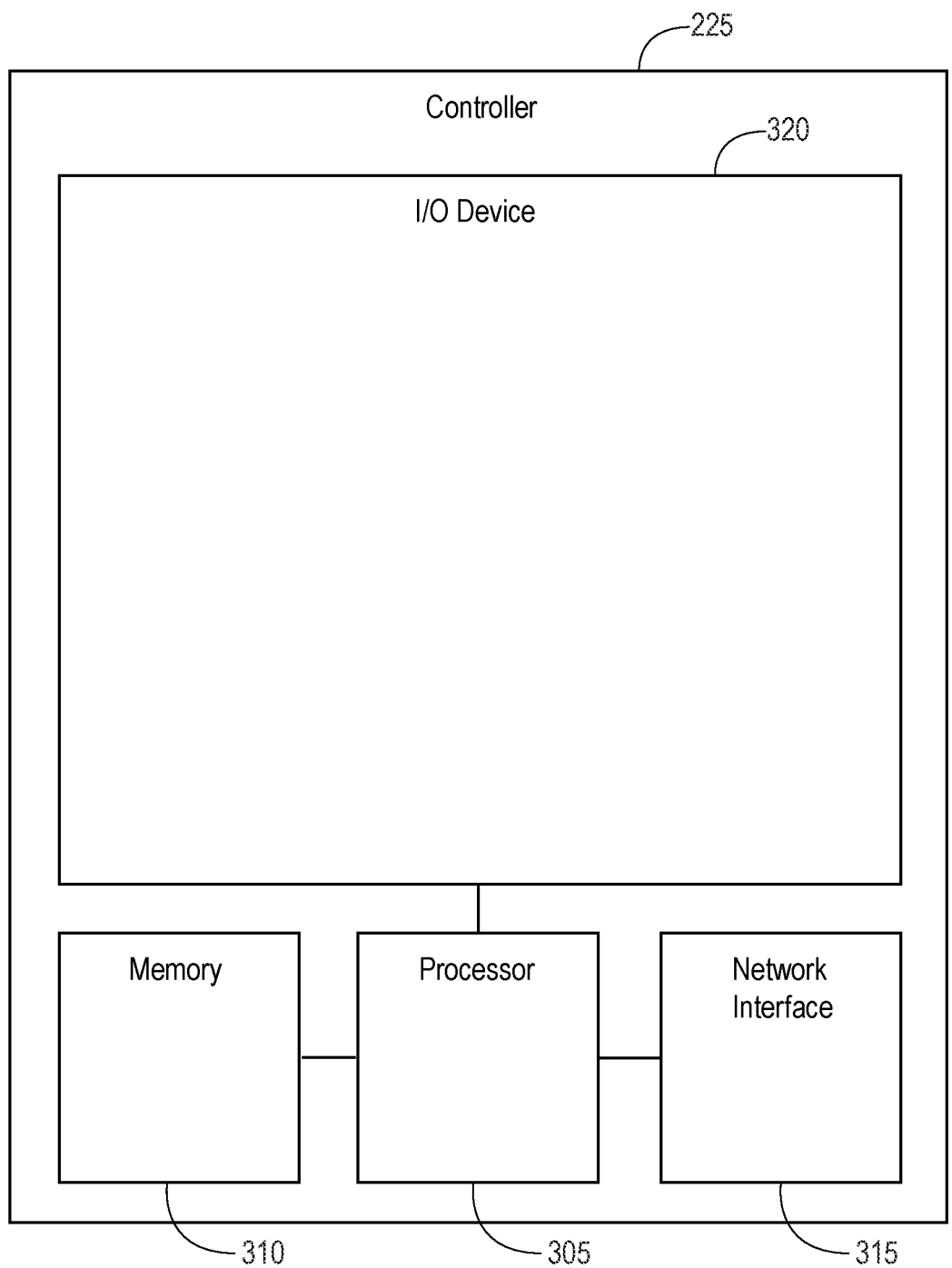
FIG. 3 is a block diagram of a controller for a robot used in the FIG. 1 system.

FIG. 3 shows a block diagram of one example of the controller 225 used in the robot 105. It should be recognized that the controller 225 can be configured differently than is shown in FIG. 3 in other examples. As shown, the controller 225 includes a processor 305, memory 310 operatively connected to the processor 305, and a network interface 315 operatively connected to the processor 305. In some cases, the controller 225 further includes an input/output device (I/O device) 320 operatively coupled to the processor 305. As should be recognized, the processor 305 processes instructions and performs other operations for controlling the robot 105, and the memory 310 is used to store the information. Through the processor 305 and memory 310, the controller 225 is able to perform the methods described herein. For example, the controller 225 controls the movement and picking operation of items 220 by the robot 105. The network interface 315 facilitates wired and/or wireless communication with the network 120. In one form, the network interface 315 includes a network interface card (NIC). In other forms, the network interface 315 is not a separate component, but the network interface 315 is integrated into the processor board of the controller 225. The I/O device 320 can be used to provide various information and alerts for the robot 105, and the I/O device 320 can allow a human operator or maintenance worker to control the robot 105, perform updates, troubleshoot, and perform other procedures on the robot 105. In one form, the I/O device 320 includes a touchscreen, buttons, a keyboard, lights, and a speaker, but the I/O device 320 of the controller 225 can be configured differently in other forms.

Figure 4:
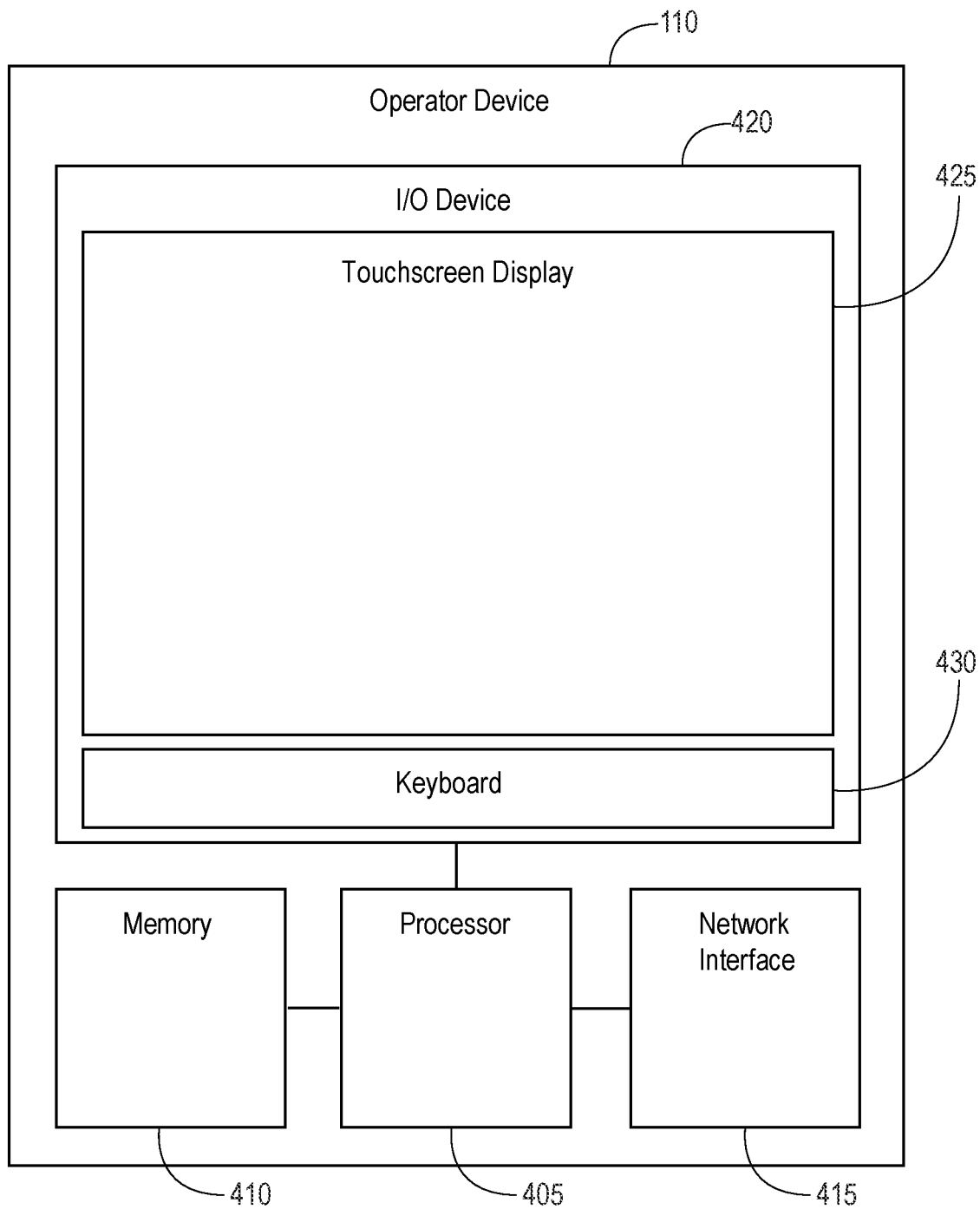
FIG. 4 is a block diagram of an operator device used in the FIG. 1 system.

FIG. 4 shows a block diagram of one example of the operator device 110. It should be recognized that the operator device 110 can be configured differently than is shown in FIG. 4 in other examples. As shown, the operator device 110 includes a processor 405, memory 410 operatively connected to the processor 405, and a network interface 415 operatively connected to the processor 405. The operator device 110 further includes an input/output device (I/O device) 420 operatively coupled to the processor 405. As should be recognized, the processor 405 processes instructions and performs other operations for the operator device 110, and the memory 410 is used to store the information. Through the processor 405 and memory 410, the operator device 110 is able to perform the methods described herein. For example, the operator device 110 is able to receive an alert, receive instructions from the human operator via the I/O device 420, and send instructions to the robot 105 so as to remedy the particular issue. The network interface 415 facilitates wired and/or wireless communication with the network 120. In one form, the network interface 415 includes a network interface card (NIC). In other forms, the network interface 415 is not a separate component, but the network interface 415 is integrated into the processor board of the operator device 110.

The I/O device 420 can be used to provide various information and alerts for the robot 105, and the I/O device 420 can allow a human operator to address the issue. in the illustrated example, the I/O device 420 includes a display in the form of a touchscreen 425 and a keyboard 430. It should be appreciated that the I/O device 420 can be configured differently in other examples. For example, the I/O device 420 can alternatively or additionally include one or more buttons, lights, displays, haptic feedback devices, microphones, and/or speakers. Through the touchscreen 425, the operator device 110 is able to display a static image or video of the robot station 200 (FIG. 2) from the camera 230 of the robot 105 showing the dropped item 255, the difficult item 260, and/or other issues as well as any associated text information. For example, the image displayed on the touchscreen 425 of the operator device 110 may show a dropped item 255 along with a text alert identifying the robot 105. The human operator then touches the touchscreen 425 at the location of the dropped item 255 (or via a mouse pointer and the like) so as to instruct the robot 105 to pick up the designated dropped item 255. Other instructions to the robot 105 can be entered through the keyboard 430. In another example, the robot 105 may be unable to pick up the difficult item 260 with the end effector 250. The camera 230 at the robot station 200 provides the static image or video showing the robot workspace 205. Through the touchscreen 425 of the operator device 110, the human operator is able to remotely designate which item 220 to pick and/or which surface of the difficult item 260 to engage with the end effector 250 of the robot 105. After the instructions from the human operator are processed by the processor 405 of the operator device 110, the network interface 415 sends the instructions to the robot 105 directly over the network 120 or indirectly over the network 120 via the material handling management system 115.

Figure 5:
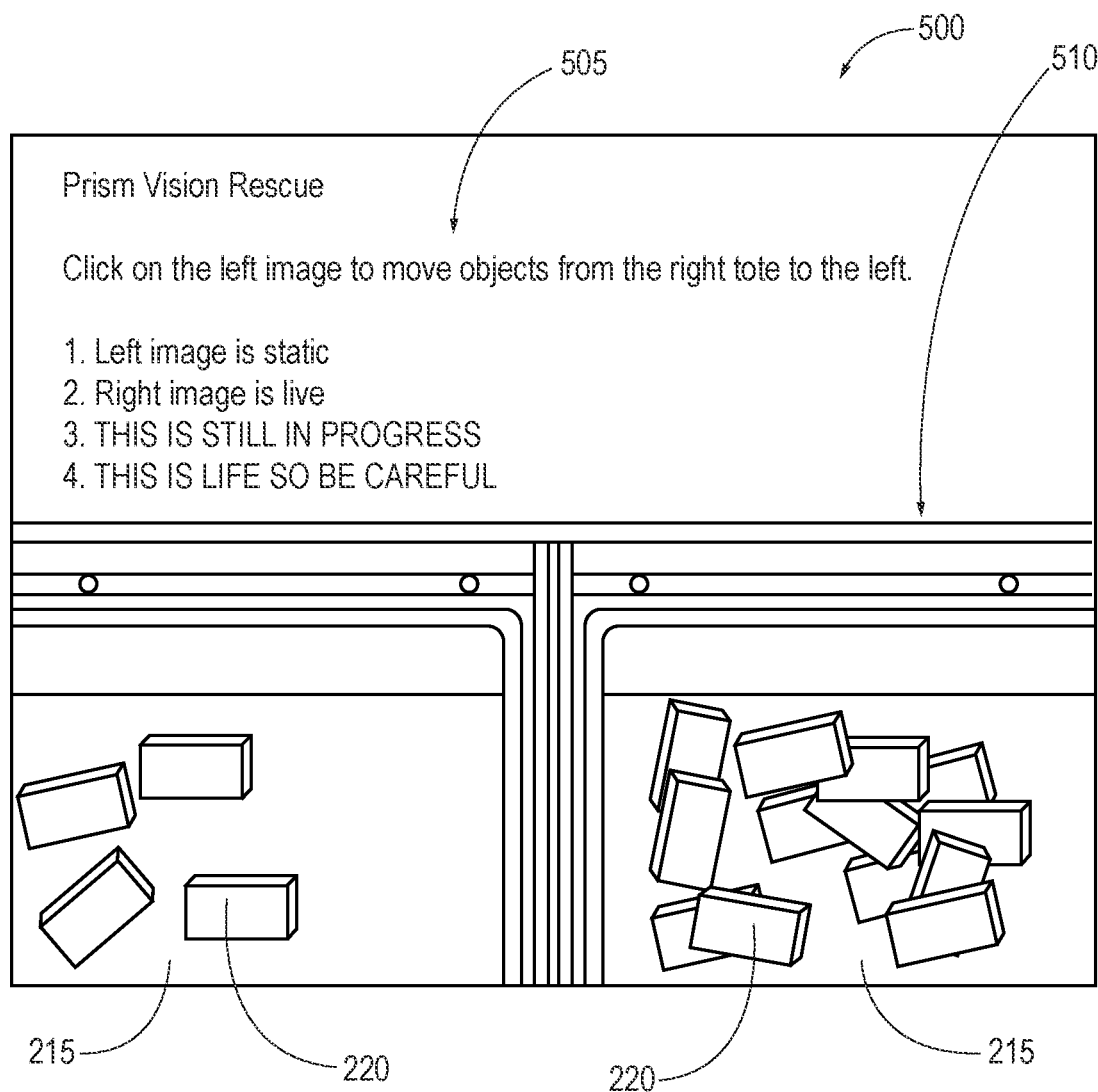
FIG. 5 is a screen rendering of a rescue screen that can be shown on the FIG. 4 operator device.

FIG. 5 shows an example of an alert or rescue screen 500 that can be displayed on the display (e.g., the I/O device 420) of the desktop computer 145 and/or the laptop computer 150. Through the rescue screen 500, the human operator is able to remotely diagnose and remedy issues with the robot 105 at the robot station 200. In the depicted example, the rescue screen 500 is generated via a web browser on the operator device 110, but it should be recognized that the rescue screen 500 can be provided in other ways such as via a proprietary client. As can be seen, the rescue screen 500 includes a text section 505 where information about the particular fault or issue at the robot station 200 as well as any instructions are shown. The rescue screen 500 further includes an image section 510 where one or more images from the camera 230 of the robot 105 are shown. The image in the image section 510 can be a single static image or multiple images shown in sequence to form a video to show motion. For explanation purposes only, the images will be described as static images, but it should be recognized that the images can include videos to show motion. Moreover, the image section 510 in one version shows live images from the camera 230, but in other variations, the images in the image section 510 can be time delayed due to processing or other requirements. In the illustrated example, the image section 510 shows items 220 being carried in bins 215. Through a mouse pointer displayed on the rescue screen 500, the human operator is able to, for example, select one of the items 220 to be handled by the robot 105.

Figure 6:
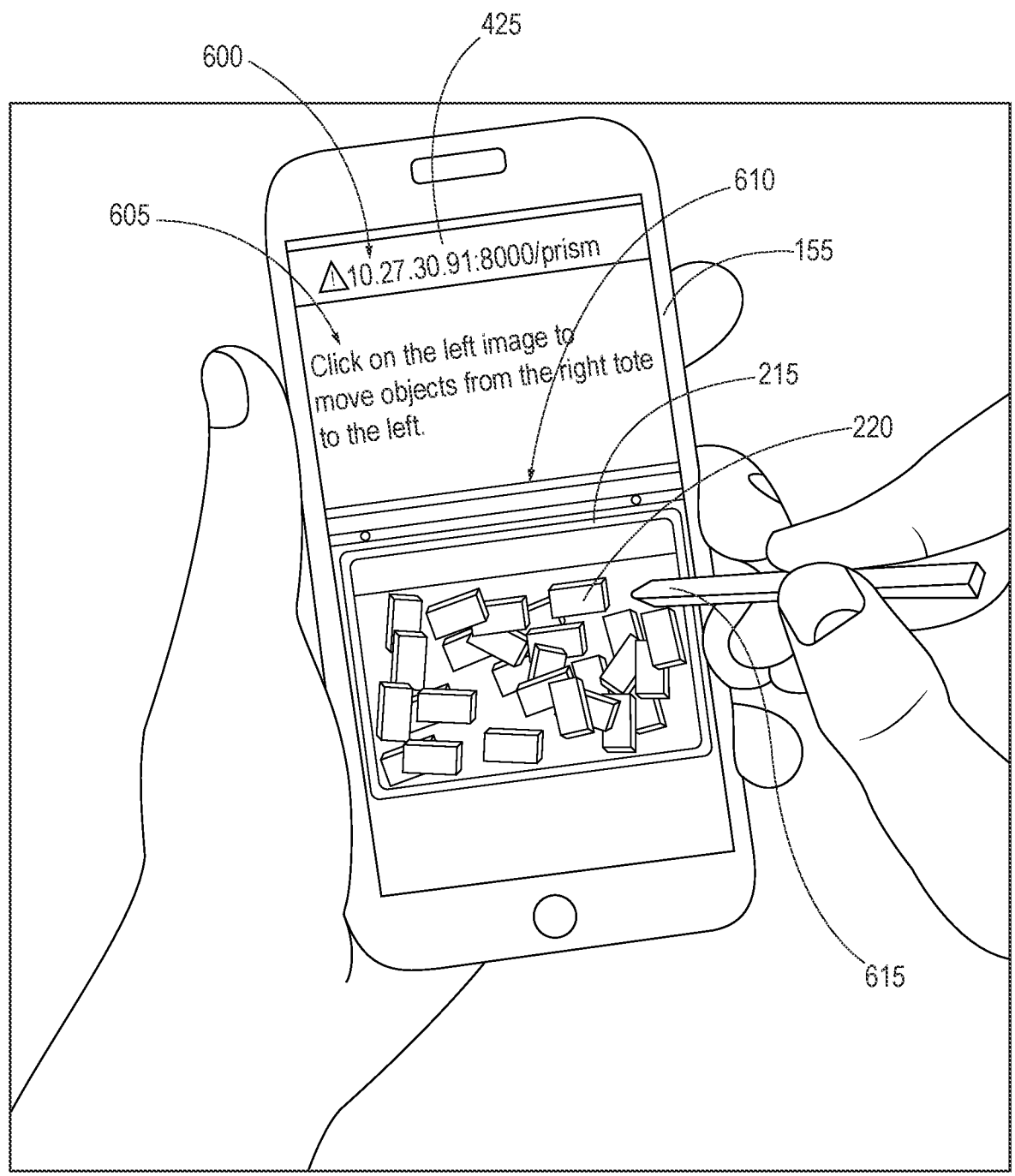
FIG. 6 is a screen rendering of a rescue screen that can be shown on a mobile device of FIG. 1.

FIG. 6 shows an example of an alert or rescue screen 600 that can be displayed on the touchscreen 425 of the mobile device 155. Through the rescue screen 600, the human operator is able to remotely diagnose and remedy issues with the robot 105 at the robot station 200. In the depicted example, the rescue screen 600 is generated via a web browser on the operator device 110, but it should be recognized that the rescue screen 600 can be provided in other ways such as via a proprietary client. As can be seen, the rescue screen 600 includes a text section 605 where information about the particular fault or issue at the robot station 200 as well as any instructions are shown. The rescue screen 600 further includes an image section 610 where one or more images from the camera 230 of the robot 105 are shown. The image in the image section 610 can be a single static image or multiple images shown in sequence to form a video to show motion. For explanation purposes only, the images will be described as static images, but it should be recognized that the images can include videos to show motion. Moreover, the image section 610 in one version shows live images from the camera 230, but in other variations, the images in the image section 610 can be time delayed due to processing or other requirements. In the illustrated example, the image section 610 shows the items 220 being carried in the bins 215. In the depicted example, the human operator interacts with the touchscreen 425 through a stylus 615, but the human operator can interact with the touchscreen 425 in other manners such as via finger touches and gestures. With the stylus 615, the human operator is able to, for example, select one of the items 220 to be handled by the robot 105.

Figure 7:
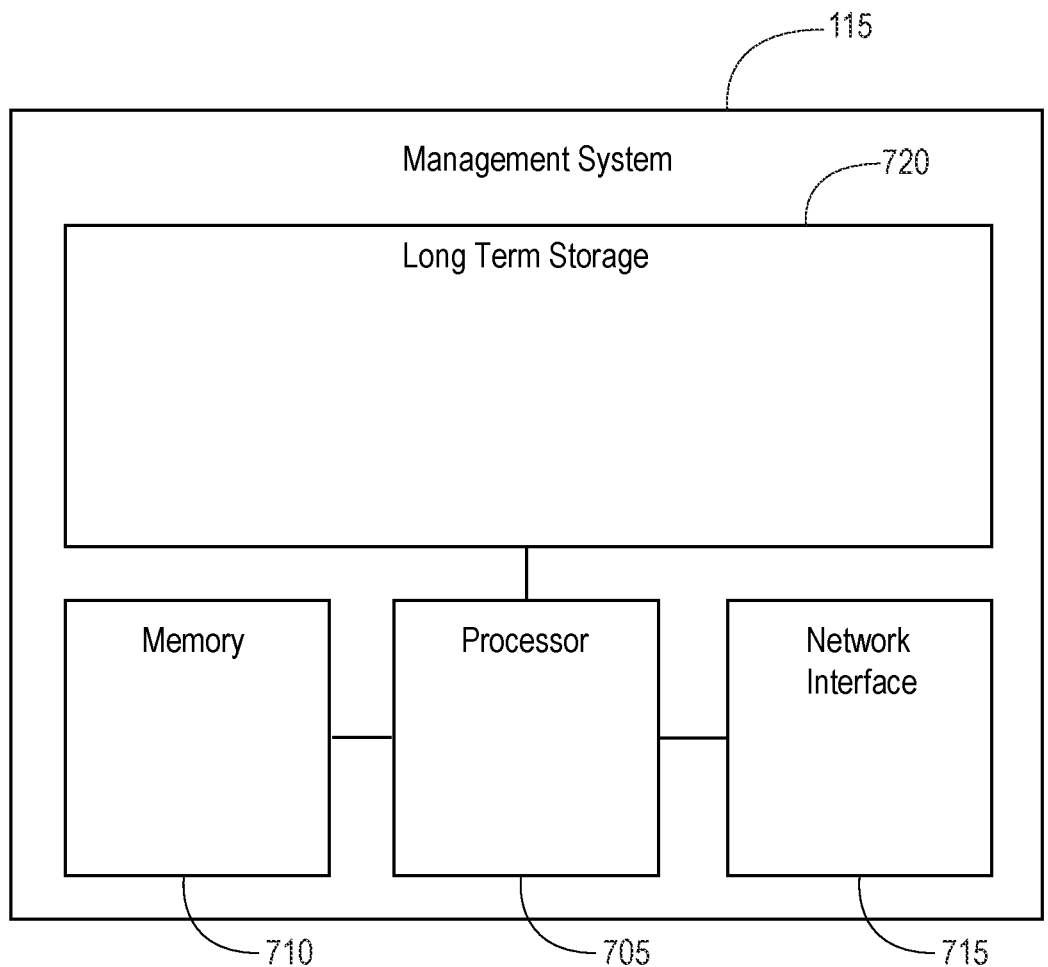
FIG. 7 is a block diagram of an example of a material handling management system used in the FIG. 1 system.

FIG. 7 shows a block diagram of one example of the material handling management system 115 used in the system 100 of FIG. 1. It should be recognized that the material handling management system 115 shown in FIG. 7 can be configured differently in other examples. As shown, the material handling management system 115 includes a processor 705, memory 710 operatively connected to the processor 705, and a network interface 715 operatively connected to the processor 705. In some cases, the material handling management system 115 further includes a long-term storage device 720 operatively coupled to the processor 705. As should be recognized, the processor 705 processes instructions and performs other operations for monitoring and controlling the system 100, and the memory 710 is used to store the information on a short-term basis. The long-term storage device 720 is used to store large amounts of information over a long time period. In some examples, the long-term storage device 720 includes a hard drive, an array of hard drives, and/or a dispersed system of virtual hard drives. The network interface 715 facilitates wired and/or wireless communication with the network 120. In one form, the network interface 715 includes a network interface card (NIC). In other forms, the network interface 715 is not a separate component, but the network interface 715 is integrated into the processor board of the material handling management system 115.

Through the processor 705, memory 710, network interface 715, and long-term storage device 720, the material handling management system 115 is able to perform the methods described herein. For example, the material handling management system 115 via the AI system 160 can be used to train the robots 105 to handle the items 220. In some cases, the material handling management system 115 acts as an intermediary to process and route faults or other alert messages from the robots 105 to the operator device 110 of the appropriate human operator. In one form, the long-term storage device 720 stores data sets that are used by the AI system 160 for training purposes using a machine learning technique via an artificial neural network (e.g., deep learning). For instance, vast data sets containing images of items 220 and various material handling environments are used in order to detect the edges of items 220 and develop techniques for handling the items 220 with the robots 105. The resulting training information from the AI system 160 is transmitted by the network interface 715 over the network 120 to the robots 105 so that the robots 105 are able to handle the items 220.

Figure 8:
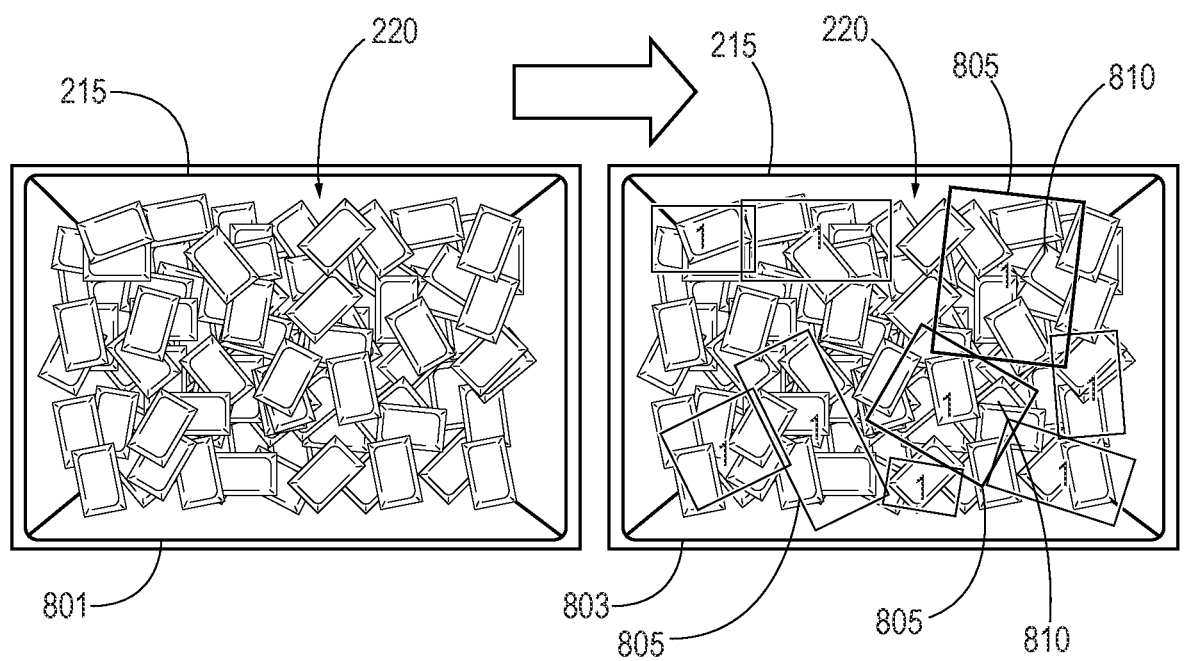
FIG. 8 is a screen rendering of a raw image and a processed image processed by the FIG. 7 material handling management system.

FIG. 8 illustrates an example of how the AI system 160 of the material handling management system 115 generally processes an image data set using machine learning and other computer vision techniques to develop an AI model that can be used by the robots 105 to handle the items 220. Via various machine learning and computer vision techniques, the AI system 160 converts a raw image 801, such as from the camera 230 of the robot 105, to a processed image 803. In the illustrated example, the items 220 are contained in the bin 215. The items 220 in this particular example are clear plastic bags containing various objects like bolts or other parts. Discerning and differentiating such bags can be quite difficult. Due to the clear and reflective nature of the bags, determining the edges and pickable surfaces of the bags can be rather difficult which in turn can make picking up the bags difficult for the robots 105.

Via machine learning and other computer vision techniques, the AI system 160 of the material handling management system 115 can generate the resulting processed image 803 that includes edge lines 805 that mark the edges of the items 220. The edge lines 805 of the items 220 in the processed image 803 provide the robot 105 to differentiate surfaces 810 of the items 220. For example, the robot 105 is able to discern unpickable from pickable surfaces 810 of the items 220. In the image section 510 of the rescue screen 500, these edge lines 805 can be shown to the human operator so as to help with the recovery process for the robot 105. The resulting AI model from the AI system 160 is then used to control the operation of the robots 105. While the AI system 160 and associated machine learning techniques have been described as being performed on the material handling management system 115, the robots 105 in other variations incorporate the AI system 160 such that the machine learning occurs locally on the robot 105.

Figure 9:
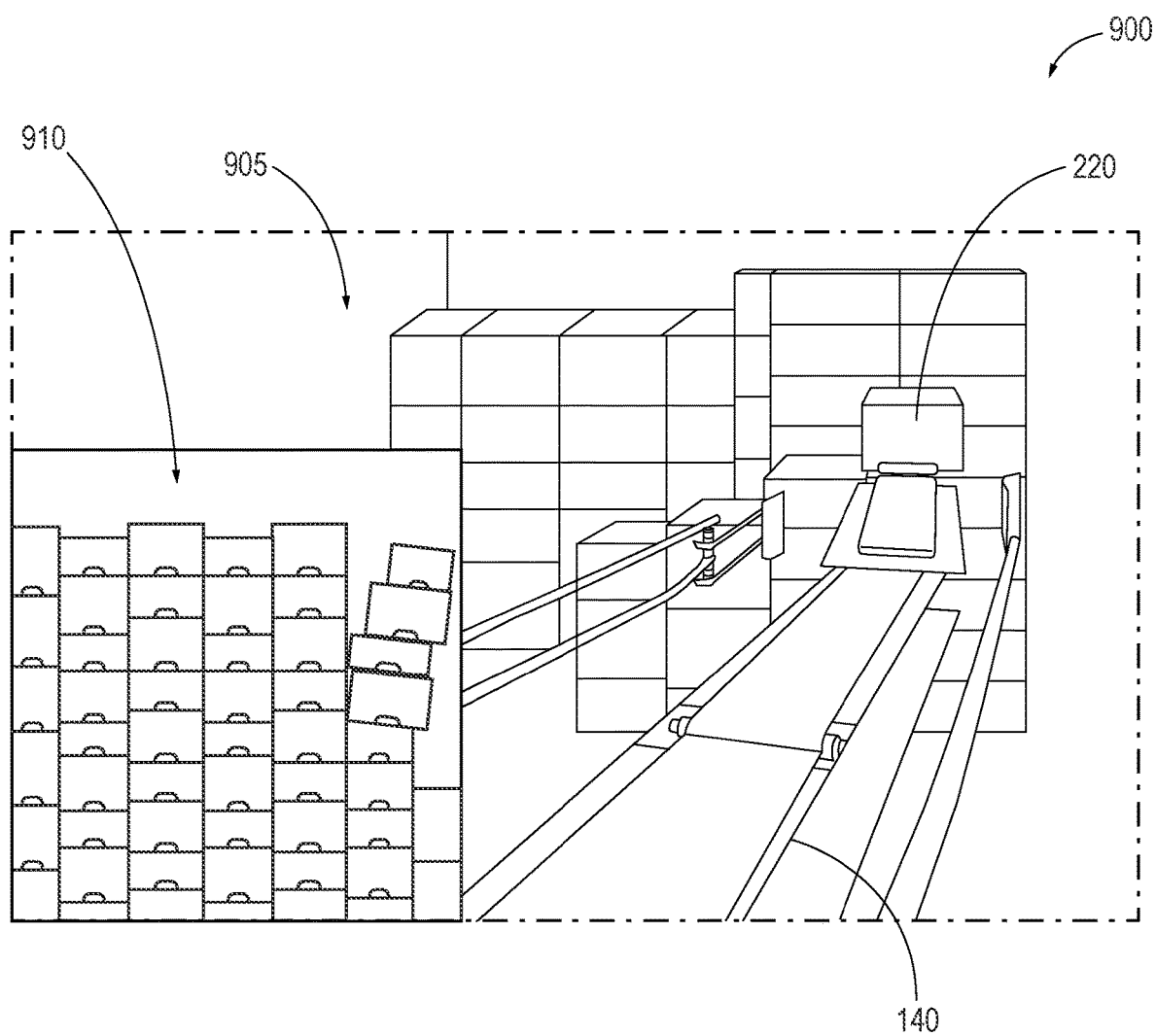
FIG. 9 is a screen rendering of a screen for a robotic mast vehicle of FIG. 1 used to load or unload a trailer.

FIG. 9 shows an example of a screen 900 generated by the material handling management system 115 that can be displayed on the I/O device 420 of the operator device 110. In this example, the robotic mast vehicle 140 is used to load or unload items 220 in the form of boxes within a trailer 905. Depending on whether the robotic mast vehicle 140 is loading or unloading, the robotic mast vehicle 140 stacks or unstacks the boxes within the trailer 905. Via one or more images from the camera 230 of the robotic mast vehicle 140, the AI system 160 of the material handling management system 115 is able to identify the individual boxes and develop a model of the stacked boxes which is shown in a diagram section 910 of the screen 900. The diagram section 910 provides the human operator a clearer understanding how the robot 105 is processing the items 220 in the trailer 905 such that the operator is able to make more educated decisions when a fault occurs. In other variations, the screen 900 is generated by the robot 105 and sent to the appropriate operator device 110 such as via a peer-to-peer type connection or relationship.

Figure 10:
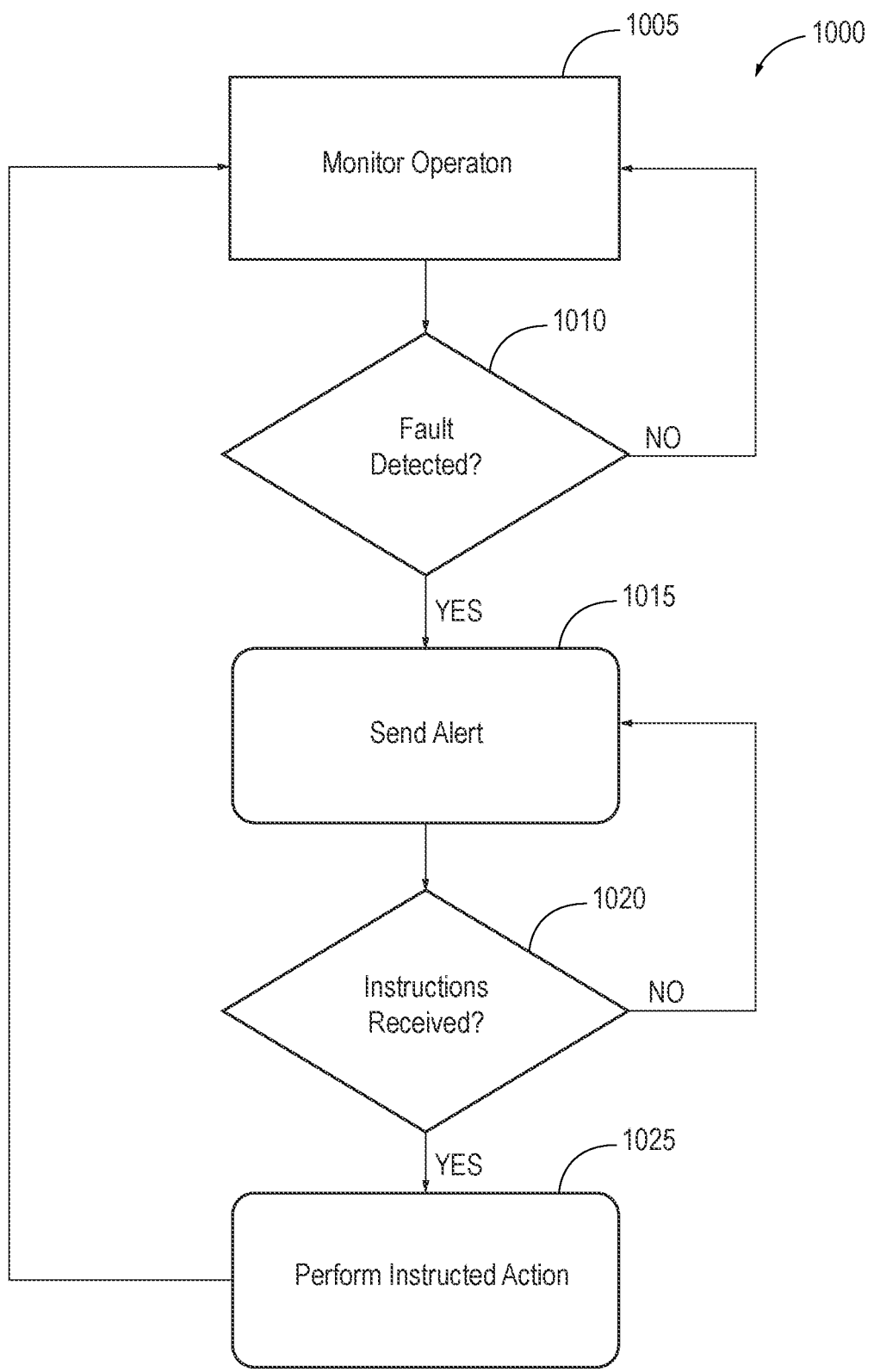
FIG. 10 is a flowchart of a technique for handling faults with a robot in the FIG. 1 system.

A technique for generally handling faults at the robot 105, such as dropped items 255, difficult items 260, and the like, will now be described with reference to flowchart 1000 in FIG. 10. As noted before, the system 100 has several capabilities such as handling failures to receive pick points of items 220, dropped item recovery, and user controlled custom pick point selection which allows a user to specify a unique surface feature as the target pick point outside the center of the target item 220. The technique illustrated by the FIG. 10 flowchart 1000 will be described as generally being performed by the controller 225 of the robot 105. For this particular example, the controller 225 of the robot 105 forms a peer-to-peer type relationship over the network 120 with a designated operator device 110, but in other examples, the material handling management system 115 acts as an intermediary between the robot 105 and the operator device 110 so as to process and route the communications over the network 120. In other variations, all or part of the actions described with reference to this flowchart 1000 can be performed by the material handling management system 115 and/or other devices. It should be recognized that the various actions for this technique are performed by the appropriate components of the controller 225, such as the processor 305, memory 310, and network interface 315, and for the sake of clarity, the robot 105 will be generally referred to as performing the actions. For example, some of the actions utilizing logic are performed by the processor 305 of the controller 225, but these logical actions will be described as being performed by the robot 105 and/or the controller 225.

Moreover, the technique in the flowchart 1000 of FIG. 10 will be described with reference to the robot station 200 shown in FIG. 2, but it should be recognized that the technique can be used in other material handling environments and with other types of robots 105.

Referring to FIGS. 1 and 2, the robot arm 125 is used to pick and/or place items 220 in the bins 215. Looking at FIGS. 2 and 10, the controller 225 of the robot 105 via the camera 230 and sensor 235 monitors in stage 1005 determines whether there is a fault or issue with the material handling process at the robot station 200. In stage 1010, the controller 225 determines whether or not a fault has occurred. If not, the controller 225 continues to monitor the situation in stage 1005. Otherwise, when a fault is detected in stage 1010, the processor 305 in the controller 225 via the network interface 315 (FIG. 3) sends an alert message or signal to the appropriate operator device 110 in stage 1015. A fault can for example occur when the dropped item 255 is dropped outside of the appropriate bin 215, or when the difficult item 260 is determined to be unpickable or unplaceable such as via one or more failed attempts by the end effector 250 of the robot arm 125 to grip or otherwise secure the difficult item 260. For instance, when the end effector 250 is in the form of one or more vacuum cups, the sensor 235 can be a vacuum sensor that detects whether proper suction is achieved with the vacuum cups when engaging with the item 220. Alternatively or additionally, the camera 230 can be used to determine whether the item 220 is properly secured to the end effector 250 of the robot 105. In still yet another example, the fault can occur when the controller 225 is unable to discern via images from the camera 230 which item 220 to pick or place next and/or which surface of the item 220 to engage with the end effector 250.

As noted before, the fault alert can be directly sent by the robot 105 to the operator device 110 in stage 1015, or the alert in other examples is first sent to the material handling management system 115 over the network 120 which in turns sends the alert to the operator device 110 of the human operator currently on duty for the particular robot 105. In stage 1020, the controller 225 of the robot 105 determines whether a response to the alert with instructions has been received from the operator device 110 (or the material handling management system 115). If a response is not received after a specific duration (e.g., 1 minute), the controller 225 may send another alert to the operator device 110. In another variation, the robot 105 only sends a single alert message and takes other types of corrective action, such as tripping an alarm, if no response is received by an appropriate time. While waiting to the receipt of instructions in one variation, the robot 105 can be partially or fully shut down or otherwise be deactivated so as to stop performing any handling actions of the items 220. In another variation, such as where the fault is not severe (e.g., the dropped item 255 in FIG. 2), the robot 105 can continue to perform some or all of the material handling activities. The alert can come in a number of forms. In one example, the alert is in the form of a uniform resource locator (URL) address for a web page showing for instance the rescue screen 500 in FIG. 5 or the rescue screen 600 in FIG. 6 which is generated by the robot 105 and/or the material handling management system 115.

When the controller 225 of the robot 105 determines that instructions from the operator device 110 have been received in stage 1020, the controller 225 controls the robot arm 125 to perform the instructed action in stage 1025. For example, the robot arm 125 picks the item 220 selected by the human operator in stage 1025 or performs some other instructed action. For instance, the instructions from the human operator may include the location where the dropped item 255 is located and to pick up the dropped item 255. In another example, the instructions can include the surface 810 where the robot arm 125 should engage the item 220. Once the instructed action is performed by the robot 105, the controller 225 returns to monitoring for faults in stage 1005 so as to continue the process.

Figure 11:
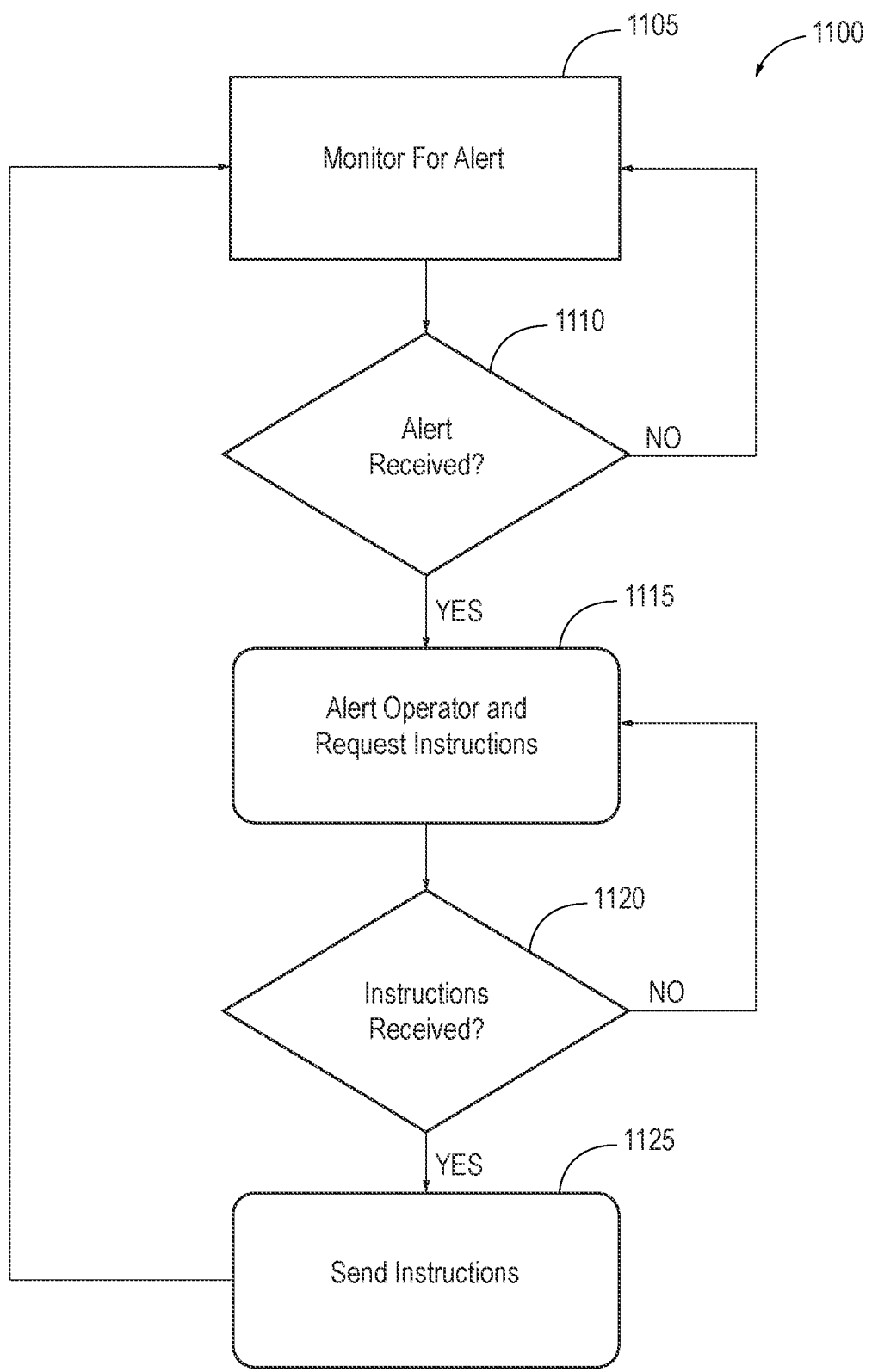
FIG. 11 is a flowchart of a technique for providing instructions on how to handle the faults.

A technique for processing the alert at the operator device 110 will now be described with reference to flowchart 1100 in FIG. 11. For the sake of clarity, the technique will be described with reference to a peer-to-peer or direct type communication arrangement between the robot 105 and the operator device 110 over the network 120. However, the technique can be also performed where the material handling management system 115 or other device acts as an intermediary between the robot 105 and operator device 110. It should be recognized that the various actions for this technique are performed by the appropriate components of the operator device 110, such as the processor 405, memory 410, network interface 415, and I/O device 420 (FIG. 4), and for the sake of clarity, the operator device 110 will be generally referred to as performing the actions. For example, some of the actions utilizing logic are performed by the processor 405 of the operator device 110, but these logical actions will be described more generally as being performed by the operator device 110.

In stage 1105, the processor 405 via the network interface 415 of the operator device 110 monitors the traffic on the network 120 to see if an alert has been received from one of the robots 105. For instance, the alert can include a URL address to a web page generated by the robot 105 and/or the material handling management system 115. The operator device 110 in stage 1110 determines if the alert has been received, and if no alert has been received, the operator device 110 continues to monitor for alerts in stage 1105. When an alert is received in stage 1110, the operator device 110 via the I/O device 420 alerts the human operator of the material handling fault. For instance, the operator device 110 may generate an audible alert, a visual alert, and/or a haptic alert via the I/O device 420. For example, the rescue screen 500 of the type shown in FIG. 5 or the rescue screen 600 of the type shown in FIG. 6 can be displayed on the operator device 110. Alternatively or additionally, an alert or alarm sound may be played on the operator device 110 to gain the attention of the human operator. It should be recognized that other types of alerts or alarms may be generated on the operator device 110 or on some other devices (e.g., a facility wide alarm) so as to gain the attention of the human operator. At the same time or later, the alert may also include the text section 505 of the type in FIG. 5 or the text section 605 in FIG. 6 requesting instructions or providing additional information about the situation. The I/O device 420 may further display one or more image sections 510 such as shown in FIG. 5 (or one or more image sections 610 in FIG. 6) so that the operator is visually apprised of the situation. For instance, the human operator in stage 1115 may be shown the rescue screen 600 with the text section 605 and the image section 610 on the touchscreen 425 of the mobile device 155 in FIG. 6.

In stage 1120, the operator device 110 determines whether instructions from the human operator have been entered or otherwise received. For instance, the instructions can be received via the touchscreen 425, the keyboard 430, and/or other input device like a microphone or mouse. If no instructions are entered after a certain amount of time, the operator device 110 may issue another alert or even escalate the alert in stage 1115 such as by increasing the volume of an audible alarm. In other variations, the operator device 110 may forward the alert to a different operator device 110 and/or send the alert notification to the material handling management system 115. This action may help catch the attention of a different operator when the initial operator is not present or otherwise unavailable. In another variation, the operator device 110 takes no further action after the initial alert is issued.

The human operator can enter the instructions in several manners via the I/O device 420. For example, the human operator can enter the instructions by touching the corresponding item 220 to be handled or the surface 810 to be engaged via the touchscreen 425 shown on the image section 610 of the rescue screen 600 in FIG. 6. In the example shown in FIG. 6, the human operator selects the item 220 to be handled by pressing the stylus 615 against the corresponding item 220 shown in the image section 610. As another example, the instructions can be entered by the human operator via the keyboard 430. To prevent premature or accidental entry of instructions, the human operator may be required to press a submit button or take some other action to confirm the instructions.

Once the instructions are received from the human operator in stage 1120, the operator device 110 via the network interface 415 sends the instructions directly and/or indirectly to the alerting robot 105 over the network 120 in stage 1125. In one example, the instructions are sent directly over the network 120 from the operator device 110 to the robot 105, and in another example, the instructions are first transmitted to the material handling management system 115 which in turn retransmits the instructions to the operator device 110. Once the instructions are received, the operator device 110 processes the instructions in the manner as described above with reference to flowchart 1000 in FIG. 10. During or after the instructions are sent, the operator device 110 proceeds to stage 1105 so as to monitor for additional alerts and repeat the process again.

Figure 12:
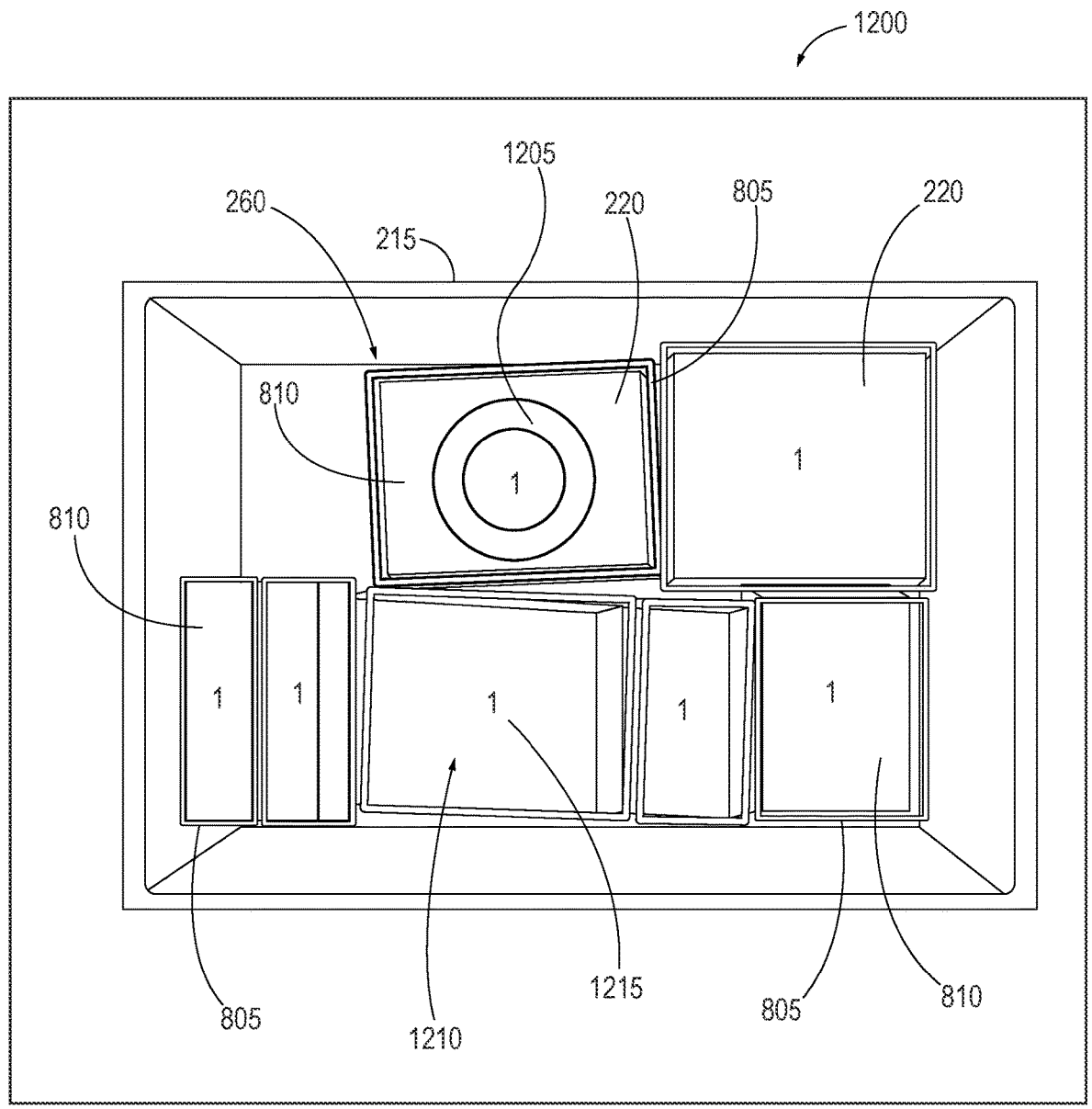
FIG. 12 is a screen rendering of one example of an image section showing a bin containing items used in the FIG. 2 robot station.

FIG. 12 shows an example of an image section 1200 that is generated by the robot 105 and/or material handling management system 115 and shown to the human operator when the robot 105 does not know which item 220 to pick, unsuccessfully attempted to pick the difficult item 260, and/or does not know which surface 810 to engage on the difficult item 260. In this example, the items 220 are contained in the bin 215. In this illustrated example, the items 220 are boxes, but other types of items 220 can be shown. The human operator is presented with an augmented image of the bin 215 which shows the edge lines 805 and surfaces 810. The items 220 may be oriented in such a way that the controller 225 of the robot 105 is unable to decide which item 220 to pick. Similarly, the orientation of the individual difficult item 260 may present two or more surfaces 810 which the robot 105 is unable to decide which surface 810 to engage. Moreover, the robot 105 may not have been able to successfully grab or suction the difficult item 260. The edge lines 805 aid the human operator in deciding which item 220 to instruct the robot 105 to pick and/or which surface 810 of the item 220 to engage with the end effector 250. For illustrative purposes, the target item 220 and/or surface 810 selected by the human operator is signified by a pointer 1205. The pointer 1205 merely signifies where the human operator touched with their finger, clicked with a mouse, or performed some other selective action. In some cases, the pointer 1205 is not visible. In other words, there is no significance to the circular shape of the pointer 1205. When a mouse pointer is used, the pointer 1205 may be shaped like an arrow or another shape. Typically, but not always, the pointer 1205 will not be displayed to the human operator when using the touchscreen 425.

In the illustrated example, one or more pick points 1210 are shown on at least some of the items 220. The system 100 generates the pick points 1210 so as to represent potential areas of the items 220 where the items 220 can be secured. The pick points 1210 in this example are indicated by coordinate icons 1215 that are indicative of the spatial relations or orientations of the items 220. In one form, the coordinate icons 1215 include different colored coordinate axis lines (e.g., red, green, and blue lines) that represent different coordinate axes. In other examples, the pick points 1210 can be represented in different forms. In still yet other versions, the image section 1200 does not have pick points 1210.

Figure 13:
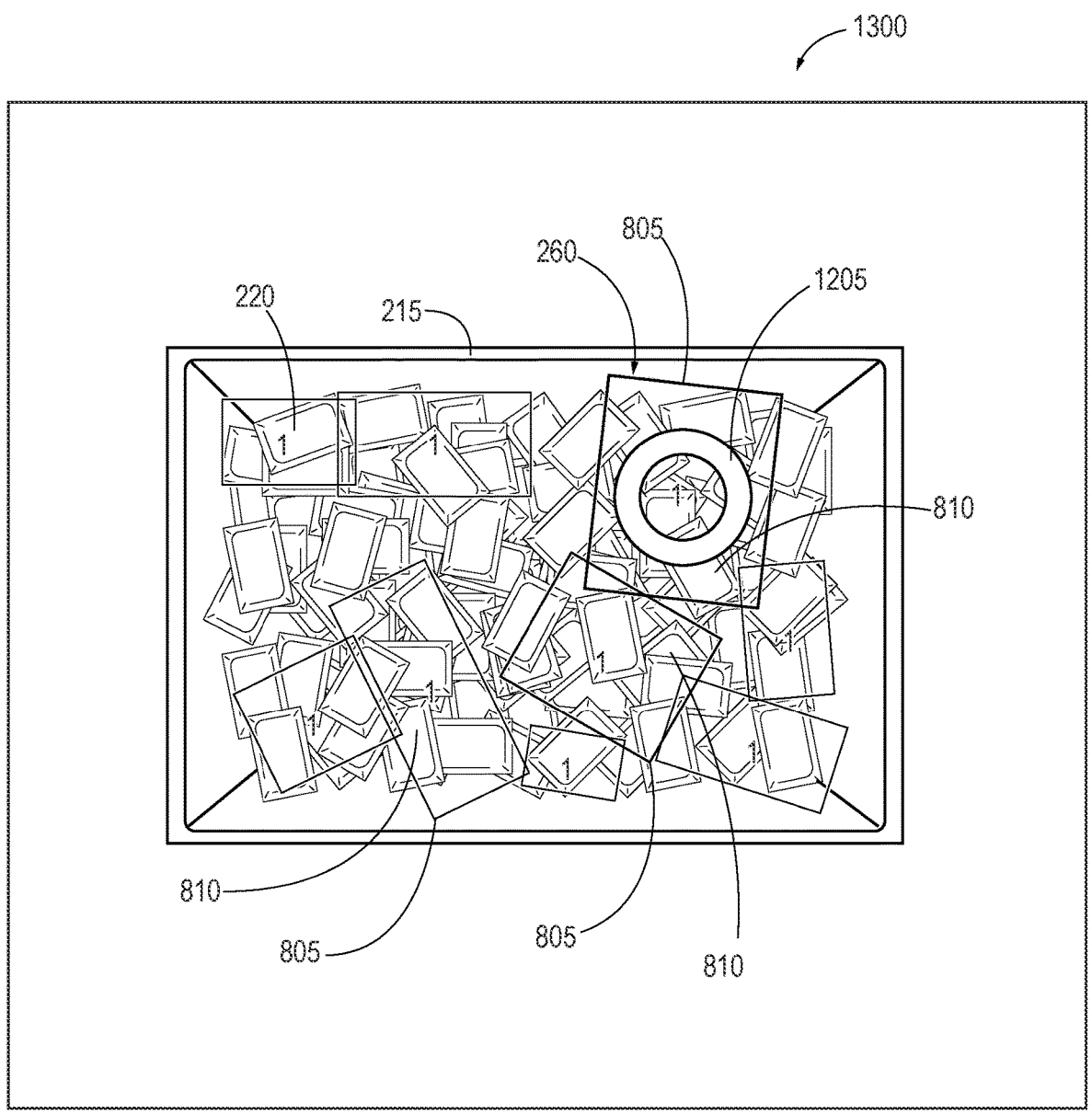
FIG. 13 is a screen rendering of another example of an image section showing a bin containing items used in the FIG. 2 robot station.

FIG. 13 shows an example of an image section 1300 that is generated by the robot 105 and/or material handling management system 115 and shown to the human operator on the operator device 110 when the robot 105 does not know which item 220 to pick, unsuccessfully attempted to pick the difficult item 260, and/or does not know which surface 810 to engage on the difficult item 260. As shown, the items 220 are contained in the bin 215. In this illustrated example, the items 220 are clear plastic bags, but other types of items 220 can be shown. The human operator is presented with an augmented image of the bin 215 which shows the edge lines 805 and surfaces 810 of the items 220 in the bin 215. The items 220 may be oriented in such a way that the controller 225 of the robot 105 is unable to decide which item 220 to pick.

Similarly, the orientation of the individual difficult item 260 may present two or more surfaces 810 which the robot 105 is unable to decide which surface 810 to engage. Moreover, the robot 105 may not have been able to successfully grab or suction the difficult item 260. Clear bags are sometimes difficult to differentiate. The edge lines 805 aid the human operator in deciding which item 220 to instruct the robot 105 to pick and/or which surface 810 of the item 220 to engage with the end effector 250. For illustrative purposes, the target item 220 and/or surface 810 selected by the human operator is again signified by the pointer 1205. The pointer 1205 merely signifies where the human operator touched with their finger, clicked with a mouse, or performed some other selective action. In other words, there is no significance to the circular shape of the pointer 1205. When a mouse pointer is used, the pointer 1205 may be shaped like an arrow or another shape. Typically, but not always, the pointer 1205 will not be displayed to the human operator when using the touchscreen 425.

A technique for generally handling difficult items 260 with the robot 105 will now be described with reference to flowchart 1400 in FIG. 14 along with FIGS. 2, 5, 6, 12, and 13. The technique illustrated by the FIG. 14 flowchart 1400 will be described as generally being performed by the controller 225 of the robot 105. For this particular example, the controller 225 of the robot 105 forms a peer-to-peer type relationship over the network 120 with a designated operator device 110, but in other examples, the material handling management system 115 acts as an intermediary between the robot 105 and the operator device 110 so as to process and route the communications over the network 120. In other variations, all or part of the actions described with reference to this flowchart 1400 can be performed by the material handling management system 115 and/or other devices. It should be recognized that the various actions for this technique are performed by the appropriate components of the controller 225, such as the processor 305, memory 310, and network interface 315, and for the sake of clarity, the robot 105 will be generally referred to as performing the actions. For example, some of the actions utilizing logic are performed by the processor 305 of the controller 225, but these logical actions will be described as being performed by the robot 105 and/or the controller 225. Moreover, the technique in the flowchart 1400 of FIG. 14 will be described with reference to the robot station 200 shown in FIG. 2 along with the screens shown in FIGS. 5, 6, 12, and 13, but it should be recognized that the technique can be used in other material handling environments and with other types of robots 105.

Figure 14:
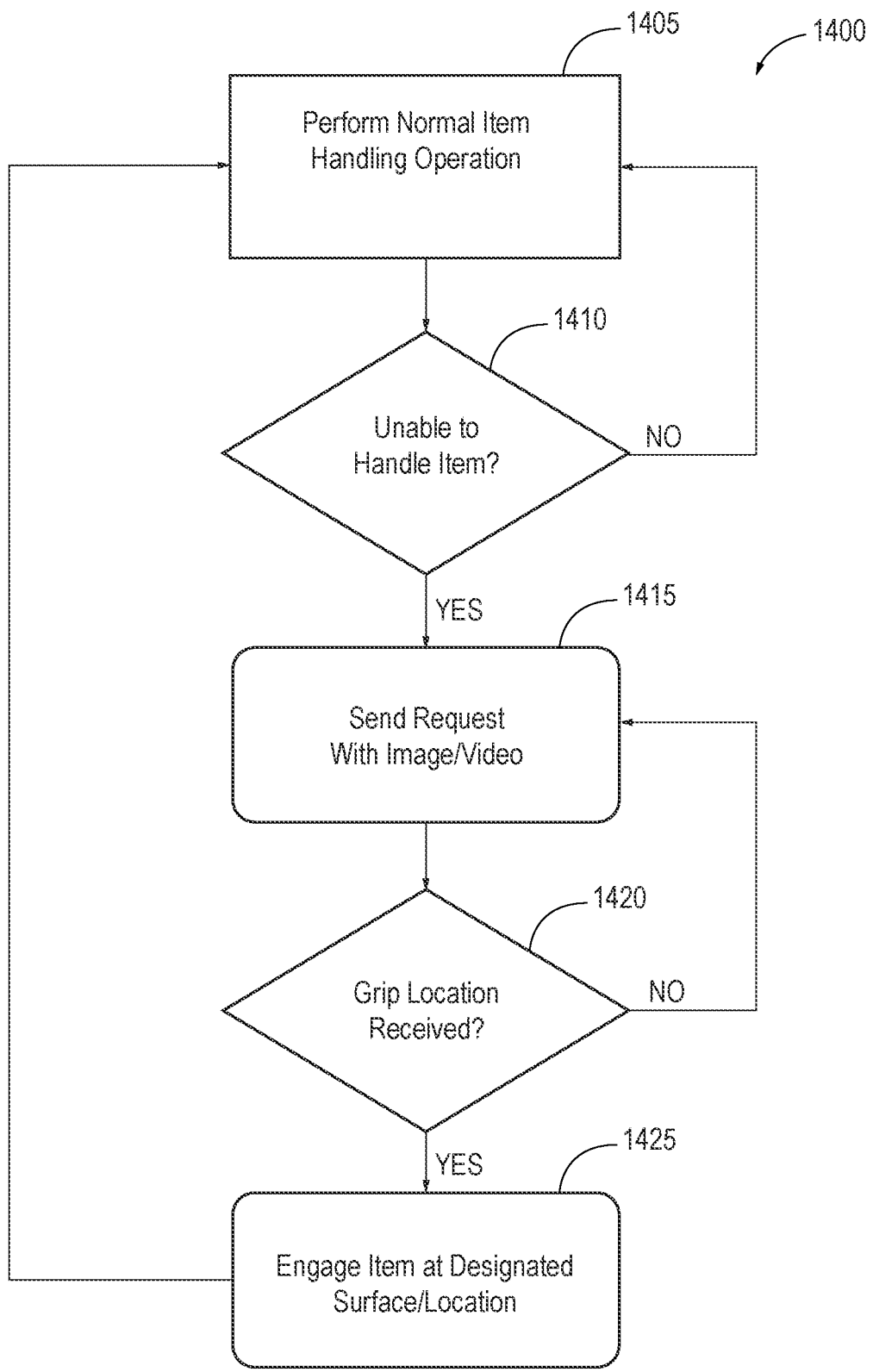
FIG. 14 is a flowchart of a technique for handling unpickable or unplaceable items.

Referring to FIGS. 2 and 14, the robot arm 125 is used to pick and/or place items 220 in the bins 215. The controller 225 of the robot 105 via the camera 230 and sensor 235 monitors in stage 1405 whether the robot station 200 is operating normally. In stage 1410, the controller 225 determents whether or not the robot 105 is able to handle the current item 220. If the robot 105 is properly handling the items 220, the controller 225 continues to monitor the situation in stage 1405. Otherwise, when the robot 105 is unable to handle the difficult item 260 in stage 1410, the processor 305 in the controller 225 via the network interface 315 (FIG. 3) sends an alert message or signal to the appropriate operator device 110 in stage 1415. The robot 105 may be unable to handle the item 220 in a number of ways. For example, the robot 105 may not be able to handle the item 220. The controller 225 may also determine the difficult item 260 to be unpickable and/or unplaceable such as after one or more failed attempts by the end effector 250 of the robot arm 125 to grip or otherwise secure the difficult item 260. In a particular example, when the end effector 250 is in the form of one or more vacuum cups, the sensor 235 can be a vacuum sensor that detects whether proper suction is achieved with the vacuum cups when engaging with the item 220. Alternatively or additionally, the camera 230 can be used to determine whether the item 220 is properly secured to the end effector 250 of the robot 105. In another example, the controller 225 determines that the robot 105 is unable to handle the items 220, such as in one of the bins 215, when the controller 225 is unable to discern via one or more images from the camera 230 which item 220 to pick or place next and/or which surface of the item 220 to engage with the end effector 250. For instance, the edge lines 805 for the items 220 are not pronounced and/or the surfaces 810 of the items 220 overlap too much so as to provide a clean engagement surface for the end effector 250.

As noted before, the fault alert can be directly sent by the robot 105 to the operator device 110 in stage 1415, or the alert in other examples is first sent to the material handling management system 115 over the network 120 which in turns sends the alert to the operator device 110 of the human operator currently on duty for the particular robot 105. In stage 1420, the controller 225 of the robot 105 determines whether a response to the alert with instructions has been received from the operator device 110 (or the material handling management system 115). If a response is not received after a specific duration (e.g., 1 minute), the controller 225 may send another alert to the operator device 110. In another variation, the robot 105 only sends a single alert message and takes other types of corrective action, such as tripping an alarm, if no response is received by an appropriate time. While waiting to the receipt of instructions in one variation, the robot 105 can be partially or fully shut down or otherwise be deactivated so as to stop performing any handling actions of the items 220. In another variation, such as where the fault is not severe (e.g., the dropped item 255 in FIG. 2), the robot 105 can continue to perform some or all of the material handling activities.

The alert can come in a number of forms. In one example, the alert is in the form of a uniform resource locator (URL) address for a web page showing for instance the rescue screen 500 in FIG. 5 or the rescue screen 600 in FIG. 6 which is generated by the robot 105 and/or the material handling management system 115. Through a web browser, the operator device 110 opens the web page at the URL address for a rescue or other screen like the FIG. 5 rescue screen 500 or the FIG. 6 rescue screen 600. The rescue screen is displayed on the I/O device 420. It should be recognized that the rescue screen can present a wide variety of image sections depending on the circumstances such as the FIG. 12 image section 1200 or the FIG. 13 image section 1300. For explanation purposes, this technique will be described with reference to the mobile device 155 and the rescue screen 600 in FIG. 6. Looking again at the FIG. 12 image section 1200, the edge lines 805 demarcate to the human operator potential surfaces 810 the robot 105 can grab or otherwise engage. With the touchscreen 425, the human operator can instruct the robot 105 which surface 810 to engage with the end effector 250 by touching the surface 810 in the image section 1200 which is indicated by the pointer 1205. Once more, the human operator can make this selection through the stylus 615 or by touching their finger to the touchscreen 425. When the robot 105 is confused as to which item 220 to pick, such as the clear plastic bags in FIG. 13, the human operator can touch with their finger or the stylus 615 the item 220 demarcated by the edge lines 805 and indicated with the pointer 1205 in FIG. 13. In other variations, these instructions can be entered in other ways such as via the keyboard 430. If needed, the human operator can confirm the instructions by clicking a submit button on the touchscreen 425, press an enter button on the keyboard 430, and/or by confirming in some other way.

When the controller 225 of the robot 105 determines that instructions from the operator device 110 have been received in stage 1020, the controller 225 controls the robot arm 125 to perform the instructed action in stage 1425. For example, the robot arm 125 picks the item 220 selected by the human operator in stage 1425 or performs some other instructed action. For instance, the instructions can include the surface 810 where the robot arm 125 should engage the item 220. Once the instructed action is performed by the robot 105, the controller 225 returns to monitoring for faults in stage 1405 so as to continue the process.

Figure 15:
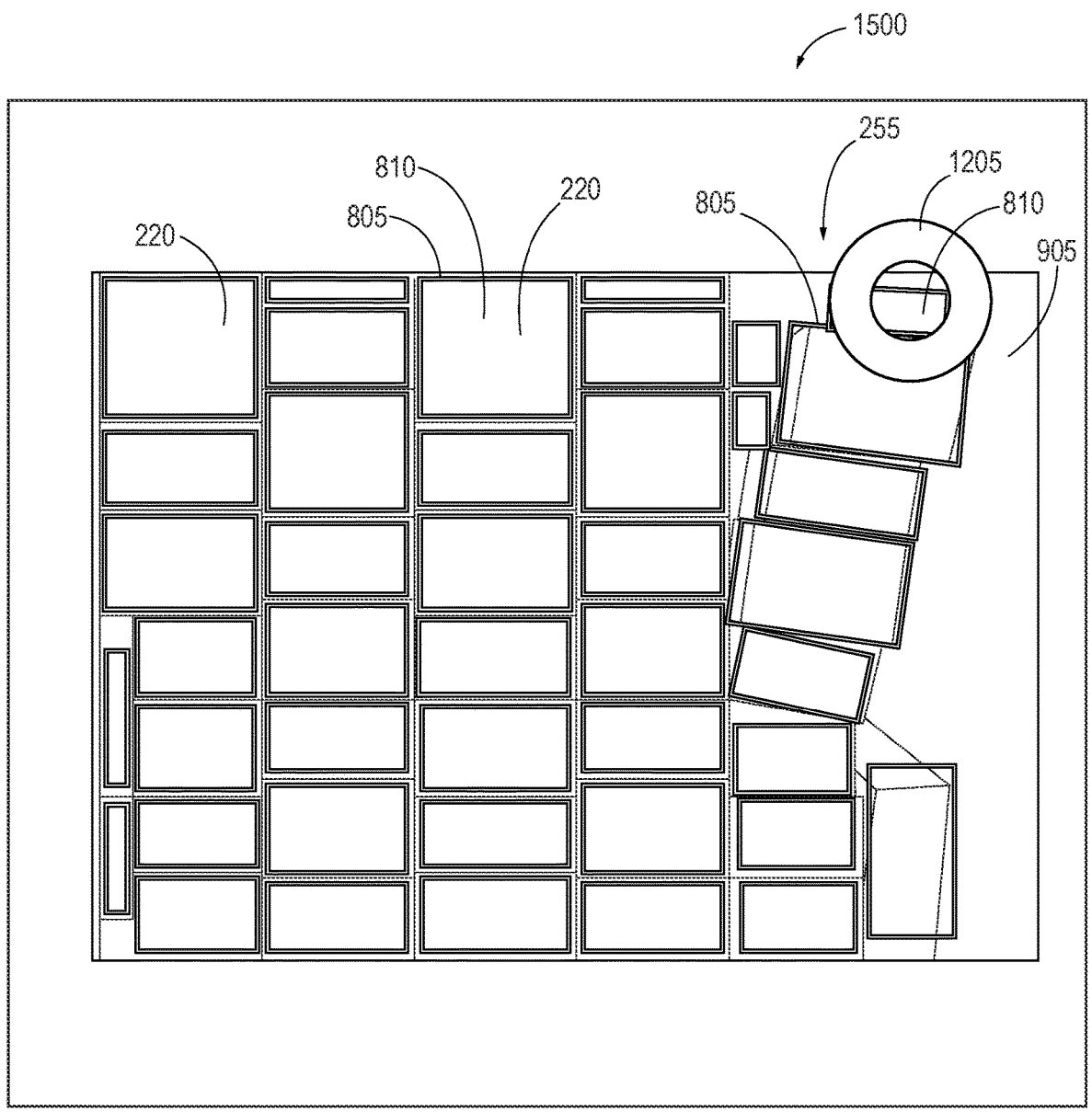
FIG. 15 is a screen rendering of an example of an image section showing items stacked in a trailer.

FIG. 15 shows an example of an image section 1500 that is generated by the robot 105 and/or material handling management system 115 and shown to the human operator via the I/O device 420 when there are one or more dropped items 255 or items 220 that are tipped/misaligned. This example will be described with reference to the environment previously described with reference to FIG. 9. In this example, the items 220 are boxes, but other types of items 220 can be shown. The robot 105 in this example is the robotic mast vehicle 140 that is used to load or unload items 220 from the trailer 905. As noted before, the robotic mast vehicle 140 is used to stack or unstack boxes or other items 220 within the trailer 905. The human operator is presented with an augmented image of the items 220 which shows the edge lines 805 and the surfaces 810 of the items 220. In the depicted example, one of stack of boxes is misaligned or tipped over, and the controller 225 is unable to discern which box to grab next in order to remedy the situation. Once more, the edge lines 805 aid the human operator in deciding which item 220 to instruct the robotic mast vehicle 140 to pick and/or which surface 810 of the item 220 to engage with the end effector 250. For illustrative purposes, the target item 220 and/or surface 810 selected by the human operator is signified by the pointer 1205. Once more, the pointer 1205 merely signifies where the human operator touched with their finger, clicked with a mouse, or performed some other selective action. In other words, there is no significance to the circular shape of the pointer 1205. When a mouse pointer is used, the pointer 1205 may be shaped like an arrow or another shape. Typically, but not always, the pointer 1205 will not be displayed to the human operator when using the touchscreen 425 because their finger will obscure the pointer 1205.

A technique for generally handling dropped items 255 or misaligned items 220 at the robot station 200 will now be described with reference to flowchart 1600 in FIG. 16 along with FIGS. 1, 5, 6, 9, and 15. The technique illustrated by the FIG. 16 flowchart 1600 will be described as generally being performed by the controller 225 of the robotic mast vehicle 140. For this particular example, the controller 225 of the robot 105 form a peer-to-peer type relationship over the network 120 with a designated operator device 110, but in other examples, the material handling management system 115 acts as an intermediary between the robot 105 and the operator device 110 so as to process and route the communications over the network 120. In other variations, all or part of the actions described with reference to this flowchart 1600 can be performed by the material handling management system 115 and/or other devices. It should be recognized that the various actions for this technique are performed by the appropriate components of the controller 225, such as the processor 305, memory 310, and network interface 315, and for the sake of clarity, the robot 105 will be generally referred to as performing the actions. For example, some of the actions utilizing logic are performed by the processor 305 of the controller 225, but these logical actions will be described as being performed by the robotic mast vehicle 140 and/or the controller 225. Moreover, the technique in the flowchart 1600 of FIG. 16 will be described with reference to the environment shown in FIGS. 9 and 15, but it should be recognized that the technique can be used in other material handling environments and with other types of robots 105.

Figure 16:
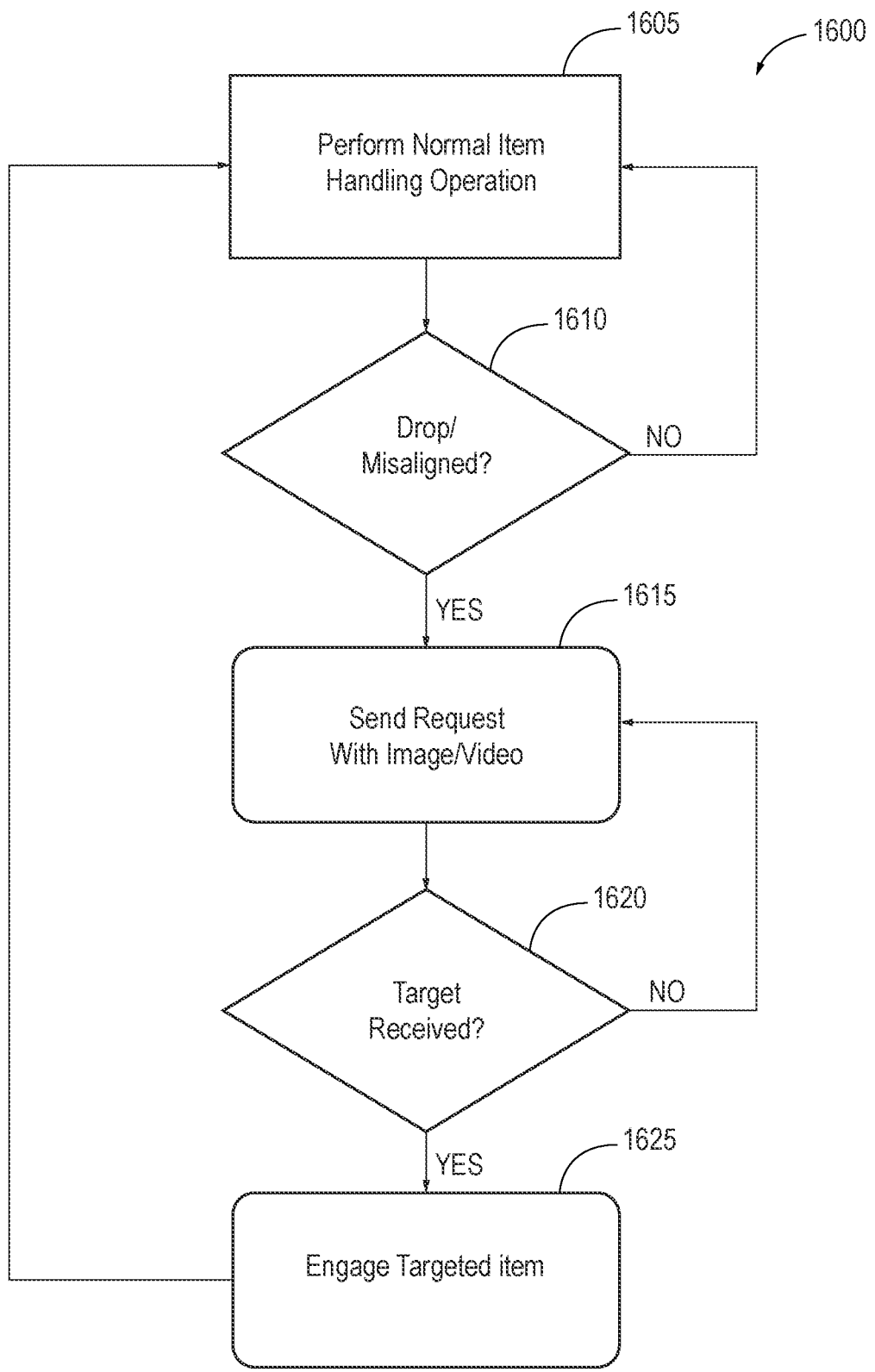
FIG. 16 is a flowchart of a technique for handling dropped or misaligned items.

Referring to FIGS. 15 and 16, the robotic mast vehicle 140 is used to load and/or unload items 220 (e.g., boxes) in the trailer 905. The controller 225 of the robotic mast vehicle 140 via the camera 230 and sensor 235 monitors in stage 1605 whether the robotic mast vehicle 140 is operating normally. In stage 1610, the controller 225 determines whether or not one or more of the items 220 have been dropped and/or misaligned. Looking for example at the FIG. 15 image section 1500, one column of boxes is tipped over so that the stacks of boxes are misaligned. FIG. 2 shows another example via the dropped item 255. If no dropped or misaligned items 220 are detected, the controller 225 of the robotic mast vehicle 140, continues to monitor the situation in stage 1605. Otherwise, when there are one or more dropped or misaligned items 220 in stage 1610, the processor 305 in the controller 225 via the network interface 315 (FIG. 3) sends an alert message or signal to the appropriate operator device 110 in stage 1615. The dropping or misalignment of items 220 may be detected in a number of ways. In a particular example, when the end effector 250 of the robotic mast vehicle 140 is in the form of one or more vacuum cups, the sensor 235 can be a vacuum sensor that detects whether proper suction is achieved with the vacuum cups when engaging with the item 220. A release of suction while the item 220 is supposed to be secured to the end effector 250 may be indicative of the item 220 being dropped. Alternatively or additionally, the camera 230 can be used to determine whether the dropped item 255 is dropped or misaligned.

As noted before, the fault alert can be directly sent by the robot 105 to the operator device 110 in stage 1615, or the alert in other examples is first sent to the material handling management system 115 over the network 120 which in turns sends the alert to the operator device 110 of the human operator currently on duty for the particular robot 105. In stage 1620, the controller 225 of the robot 105 determines whether a response to the alert with instructions has been received from the operator device 110 (or the material handling management system 115). If a response is not received after a specific duration (e.g., 1 minute), the controller 225 may send another alert to the operator device 110. In another variation, the robot 105 only sends a single alert message and takes other types of corrective action, such as tripping an alarm, if no response is received by an appropriate time. While waiting for the receipt of instructions in one variation, the robot 105 can be partially or fully shut down or otherwise deactivated so as to stop performing any handling actions of the items 220. In another variation, such as where the fault is not severe (e.g., the dropped item 255 in FIG. 2), the robot 105 can continue to perform some or all of the material handling activities.

The alert can come in a number of forms. In one example, the alert is in the form of a uniform resource locator (URL) address for a web page showing for instance the rescue screen 500 in FIG. 5 or the rescue screen 600 in FIG. 6 which is generated by the robot 105 and/or the material handling management system 115. Through a web browser, the operator device 110 opens the web page at the URL address for a rescue or other screen like the FIG. 5 rescue screen 500 or the FIG. 6 rescue screen 600. The rescue screen is displayed on the I/O device 420. It should be recognized that the rescue screen can present a wide variety of image sections depending on the circumstances such as the FIG. 9 screen 900 or FIG. 15 image section 1500. For explanation purposes, this technique will be described with reference to the mobile device 155 and the image section 1500 in FIG. 15. Looking again at the FIG. 15 image section 1500, the edge lines 805 demarcate to the human operator potential surfaces 810 the robotic mast vehicle 140 can grab or otherwise engage. With the touchscreen 425, the human operator can instruct the robotic mast vehicle 140 which surface 810 of the box to engage with the end effector 250 by touching the surface 810 in the image section 1200 which is indicated by the pointer 1205. Once more, the human operator can make this selection through the stylus 615 or by touching their finger to the touchscreen 425. As noted before, these instructions can be entered in other ways such as via the keyboard 430. If needed, the human operator can confirm the instructions by clicking a submit button on the touchscreen 425, press an enter button on the keyboard 430, and/or by confirming in some other way.

When the controller 225 of the robot 105 determines that instructions from the operator device 110 have been received in stage 1020, the controller 225 controls the robotic mast vehicle 140 to perform the instructed action in stage 1625. For example, the robotic mast vehicle 140 picks the item 220 selected by the human operator in stage 1625 or performs some other instructed action. For instance, the instructions can include the surface 810 where the robotic mast vehicle 140 should engage the item 220. Once the instructed action is performed by the robot 105, the controller 225 returns to monitoring for drops or misalignments in stage 1605 so as to continue the process.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"And/Or" generally refers to a grammatical conjunction indicating that one or more of the cases it connects may occur. For instance, it can indicate that either or both of the two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Artificial intelligence" or "AI" generally refers to the ability of machines to perceive, synthesize, and/or infer information. AI may enable a machine to perform tasks which normally require human intelligence. For example, AI may be configured for speech recognition, visual perception, decision making, language interpretation, logical reasoning, and/or moving objects. Typically, AI is embodied as a model of one or more systems that are relevant to tasks that a machine is configured to perform. AI models may be implemented on a device, such as a mechanical machine, an electrical circuit, and/or a computer. AI models may be implemented in an analog or digital form and may be implemented on hardware or software. The implementation of AI may also utilize multiple devices which may be connected in a network.

"Autonomous Mobile Unit" or "AMU" generally refer to a mobile robot that is able to automatically self-navigate between various locations. For example, AMUs are typically, but not always, able to automatically navigate by following markers, such as wires or magnets embedded in the floor, by using lasers, and/or by using one or more vision systems. AMUs are also typically, but not always, designed to automatically avoid collisions, such as with other AMUs, equipment, and personnel. AMUs are commonly, but not always, used in industrial applications to move materials around a manufacturing facility or warehouse.

"Bin" or "Tote" generally refers to a container or structure that can store or support physical objects. In one embodiment, a bin refers to a container, surface, or structure that is used in a picking system. For example, a bin may be a basket, box, crate, pallet, vehicle, conveyor, shelving structure, storage device, table, and/or a stationary surface. A bin may define an opening or have one or more unclosed sides to allow items to be added to or removed from the bin.

"Camera" generally refers to a device that records visual images. Typically, a camera may record two—and/or three-dimensional images. In some examples, images are recorded in the form of film, photographs, image signals, and/or video signals. A camera may include one or more lenses or other devices that focus light onto a light-sensitive surface, for example a digital light sensor or photographic film. The light-sensitive surface may react to and be capable of capturing visible light or other types of light, such as infrared (IR) and/or ultraviolet (UV) light.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. A computer may include one or more physical processors or other computing devices or circuitry and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of a disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

"Computer Vision" generally refers to the ability of a computer to obtain information from images and/or videos. Computer vision may perform similar tasks as in a human visual system, for example recognizing objects, tracking motion of objects, determining three-dimensional poses, determining three-dimensional shapes, and/or detecting visual events. A computer or other device may use computer vision to analyze image and/or video data recorded by a camera and/or vision system. In some embodiments, computer vision utilizes artificial intelligence to perform tasks. For example, computer vision may involve one or more artificial neural networks that are trained to obtain certain information from given images and/or videos.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus, a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using Wi-Fi or other Wireless Local Area Network (WLAN) or a cellular transmitter/receiver to transfer data.

"Conveyor" is used in a broad sense to generally refer to a mechanism that is used to transport something, like an item, box, container, and/or SKU. By way of non-limiting examples, the conveyor can include belt conveyors, wire mesh conveyors, chain conveyors, electric track conveyors, roller conveyors, cross-belt conveyors, vibrating conveyors, and skate wheel conveyors, to name just a few. The conveyor all or in part can be powered or unpowered. For instance, sections of the conveyors can include gravity feed sections.

"Couple" or "Coupled" generally refers to an indirect and/or direct connection between the identified elements, components, and/or objects. Often the manner of the coupling will be related specifically to the manner in which the two coupled elements interact.

"Edge" generally refers to a border where an object or area begins or ends. The edge is typically in the form of a line or line segment that is at the intersection of two plane faces or of two planes of an object or space.

"End of Arm Tool" (EoAT) or "End Effector" generally refers to a device at the end of the robotic arm that is designed to interact with the environment. The nature of this interaction of the device with the environment depends on the application of the robotic arm. The EoAT can for instance interact with an SKU or other environmental objects in a number of ways. For example, the EoAT can include one or more grippers, such as impactive, ingressive, astrictive, and/or contiguitive type grippers. Grippers typically, but not always, use some type of mechanical force to grip objects. However, other types of interactions, such as those based on suction or magnetic force, can be used to secure the object to the EoAT. By way of non-limiting examples, the EoAT can alternatively or additionally include vacuum cups, electromagnets, Bernoulli grippers, electrostatic grippers, van der Waals grippers, capillary grippers, cryogenic grippers, ultrasonic grippers, and laser grippers, to name just a few.

"Image" generally refers to a visual representation. The visual representation can for example be of an object, scene, person, and/or abstraction. The image can be in the form of a static picture or can include multiple images in the form of a dynamic video showing motion.

"Input Device" generally refers to any device coupled to a computer that is configured to receive input and deliver the input to a processor, memory, or other part of the computer. Such input devices can include keyboards, mice, trackballs, and touch sensitive pointing devices such as touchpads or touchscreens. Input devices also include any sensor or sensor array for detecting environmental conditions such as temperature, light, noise, vibration, humidity, and the like.

"Input/Output (I/O) Device" generally refers to any device or collection of devices coupled to a computing device that is configured to receive input and deliver the input to a processor, memory, or other part of the computing device and/or is controlled by the computing device to produce an output. The I/O device can include physically separate input and output devices, or the input and output devices can be combined together to form a single physical unit. Such input devices of the I/O device can include keyboards, mice, trackballs, and touch sensitive pointing devices such as touchpads or touchscreens. Input devices also include any sensor or sensor array for detecting environmental conditions such as temperature, light, noise, vibration, humidity, and the like. Examples of output devices for the I/O device include, but are not limited to, screens or monitors displaying graphical output, a projecting device projecting a two-dimensional or three-dimensional image, or any kind of printer, plotter, or similar device producing either two-dimensional or three-dimensional representations of the output fixed in any tangible medium (e.g., a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Item" generally refers to an individual article, object, or thing. Commonly, but not always, items are handled in warehouse and material handling environments. The item can come in any form and can be packaged or unpackaged. For instance, items can be packaged in cases, cartons, bags, drums, containers, bottles, cans, pallets, and/or sacks, to name just a few examples. The item is not limited to a particular state of matter such that the item can normally have a solid, liquid, and/or gaseous form for example.

"Machine Learning" or "Machine Learning Algorithm" generally refers to a way of developing methods for performing tasks within artificial intelligence (AI) systems. Machine learning algorithms build models based on given sets of sample data. Using these models, a machine learning algorithm may make predictions or decisions about performing tasks and may improve the ability of an AI system to perform those tasks. Examples of machine learning include supervised learning, unsupervised learning, reinforcement learning, deep learning, and statistical learning. Machine learning algorithms can be implemented on a device, for example a computer or network of computers. Implementations of machine learning may also incorporate various types of models, including artificial neural networks, decision trees, regression analysis, Bayesian networks, gaussian processes, and/or genetic algorithms.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Mobile Device" generally refers to a piece of portable electronic equipment that can connect to a network such as a wireless network, a mobile network, and/or the internet. For instance, a mobile device can include a smartphone or tablet computer.

"Network" or "Computer Network" generally refers to a telecommunications system that allows computers or other electronic devices to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

"Neural Network" or "Artificial Neural Network" generally refers to a model composed of multiple nodes. Each node receives a signal from one or more inputs or other nodes. Each node may also perform an operation on the received signal. Each node then sends a signal to one or more other nodes or outputs. The nodes may be arranged in layers such that one or more signals travels across the layers sequentially. The neural network may be given data that trains the neural network. The neural network may be trained to perform a variety of tasks, for example to recognize objects in an image, recognize patterns in a sequence, replicate motion, and/or approximate a function.

"Neuron" or "Node" or "Artificial Neuron" generally refers to a computational model within a neural network that receives one or more inputs and produces an output. Typically, the model of a neuron applies weights to the one or more inputs and sums the weighted inputs. The model of a neuron may include one or more non-linear functions, for example sigmoid, piecewise, and/or step functions. Inputs to a neuron may be outputs from one or more other neurons in the neural network or may be inputs to the neural network as a whole. Similarly, outputs of a neuron may be inputs to one or more other neurons in the neural network or may be outputs of the neural network as a whole.

"Output Device" generally refers to any device or collection of devices that is controlled by computer to produce an output. This includes any system, apparatus, or equipment receiving signals from a computer to control the device to generate or create some type of output. Examples of output devices include, but are not limited to, screens or monitors displaying graphical output, any projecting device projecting a two-dimensional or three-dimensional image, any kind of printer, plotter, or similar device producing either two-dimensional or three-dimensional representations of the output fixed in any tangible medium (e.g., a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Pickable" generally refers to the quality of an object or a bin that contains the object to be picked by a robotic arm or other equipment. An object may be determined to be pickable if a manipulator or end of arm tool on a robotic arm or other equipment is capable of picking that object. For example, a claw on the end of a robotic arm is capable of grasping a certain pickable object. Conversely, various factors may cause an object to not be pickable, even if the equipment is typically capable of picking that object. In some examples, the object is oriented in an undesirable position or a path to the object is blocked by other objects or part of a container, and the object is determined to be unpickable. An object may be determined to be pickable through various means, for example through a computer vision system that captures and analyzes visual data about the object and/or through physical picking attempts by a robotic arm or other equipment.

"Placing" generally refers to releasing and/or setting down one or more items into a receptacle. The receptacle may be a container or surface that supports or encloses items. For example, items can be picked from a basket, box, crate, pallet, vehicle, conveyor, shelving structure, storage device, or a stationary surface. Typically, placing is performed automatically by a robotic arm or other robotic equipment. In some examples, placing is performed by a robot after a picking operation. For example, a robot may place an item into a bin after picking that item from a conveyor belt. Placing may be used to release or set items in a variety of applications. For example, placing may be utilized for fulfillment of orders, storage, packaging, unpackaging, inventory management, manufacturing, or assembling. The geometry, rigidity, and other properties of the Items can vary, and a system may be configured to place one or more types of items.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement. A processor also includes an Application-Specific Integrated Circuit (ASIC). An ASIC is an Integrated Circuit (IC) customized to perform a specific series of logical operations in controlling a computer to perform specific tasks or functions. An ASIC is an example of a processor for a special purpose computer, rather than a processor configured for general-purpose use. An application-specific integrated circuit generally is not reprogrammable to perform other functions and may be programmed when it is manufactured. In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). An FPGA may be reprogrammed using another computer to reconfigure the FPGA to implement a new set of commands or operating instructions. Such an operation may be executed in any suitable means such as by a firmware upgrade to the processor circuitry. Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g., "true" or "false"). Processing activities may occur in multiple single processors on separate servers, on multiple processors in a single server with separate processors, or on multiple processors physically remote from one another in separate computing devices.

"Recurrent Neural Network" or "RNN" generally refers to an artificial neural network wherein the outputs of one or more nodes affects one or more inputs to the same nodes. Some RNN's include memory to store various internal states and/or inputs. The memory of an RNN is stored within the RNN, stored in another neural network, and/or stored by another means. Typically, RNN's are used to perform tasks with inputs that have varying lengths. As examples, RNN's are used for identifying handwritten words, recognizing speech, generating speech, identifying actions in a video, predicting motion of an object, and/or performing other tasks. A neural network is considered fully recurrent if the outputs of all neurons in the network connect to the inputs of all neurons.

"Remote" generally refers to a physical separation or distance between a robot and a human where the human is unable to physically interact in a direct manner with the robot and any items being currently handled by the robot. In other words, when a human is considered remote from a robot, the human operate is unable to directly touch the robot or items being handled by that robot at that time, and the robot is likewise unable to touch the human. When a human is described as being remote to a particular robot, the human is located outside a workspace of the robot such that the human is unlikely to be injured by the robot or equipment associated with the robot.

"Robot" generally refers to a machine, such as one programmable by a computer, capable of carrying out a complex series of actions automatically. Sometimes, but not always, the robot automatically performs complicated, often repetitive tasks. Occasionally, the robot resembles all or part of a living creature that is capable of moving independently and/or performing complex actions such as grasping and moving objects. A robot can be guided by an external control device, or the control may be embedded within the robot.

"Robotic Arm" or "Robot Arm" generally refers to a type of mechanical arm, usually programmable, with similar functions to a human arm. Links of the robot arm are connected by joints allowing either rotational motion (such as in an articulated robot) or translational (linear) displacement. The robot arm can have multiple axes of movement. By way of nonlimiting examples, the robot arm can be a 4, 5, 6, or 7 axis robot arm. Of course, the robot arm can have more or less axes of movement or freedom. Typically, but not always, the end of the robot arm includes a manipulator that is called an "End of Arm Tool" (EoAT) for holding, manipulating, or otherwise interacting with the cargo items or other objects. The EoAT can be configured in many forms besides what is shown and described herein.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems. In other examples, the sensor includes an encoder configured to detect and encode rotational movement. The sensor may be a conductive encoder, an optical encoder, an on-axis magnetic encoder, and/or an off-axis magnetic encoder. In some forms, the sensor can be configured to convert the rotation of the encoder gear to an output signal. The output signal can be digital or analog. The output signal of the sensor indicates the position of the encoder gear.

"Server" generally refers to a computer or group of computers that provide(s) data to other computers. It may serve data to systems on a local area network (LAN) and/or a wide area network (WAN) over the Internet.

"Shuttle" generally refers to a mechanism or device that is able to transport one or more items that are resting on and/or in the device. Each shuttle is capable of moving independently of one another and is able to move in multiple directions (e.g., horizontally, vertically, diagonally, etc.) along a shuttle frame. In one example, the shuttle includes a power train that is configured to move the shuttle, a steering system to direct shuttle movement, a tote transfer mechanism with a lift mechanism, and a robotic arm configured to transfer items to and/or from the shuttle. The power train in one example includes wheels that are driven by an electric motor, but in other examples, the power train can be configured differently. For instance, the power train can include a hydraulic motor and/or a pneumatic motor.

"Stacking Pattern" generally refers to a specific arrangement of objects, such as cases, products, or other items, on a pallet or in a container. For example, the stacking pattern determines how the items are placed on the pallet, the orientation of the items, and the number of layers of the items in which the items are stacked. Sometimes, but not always, a stacking pattern can be designed to optimize the use of space on the pallet and ensure that the items are stable and secure during transportation. For instance, different stacking patterns may be used depending on the size, shape, weight, and/or fragility of the products being palletized, as well as the type of pallet and transportation method used. Common stacking patterns in robotic palletization include column stacking, interlocking stacking, block stacking, and spiral stacking.

"Surface" generally refers to an outermost or uppermost layer of a physical object or space. The surface is typically a portion or region of the object that can first be perceived by an observer using the senses of sight and touch. The surface is usually the portion with which other materials first interact.

"Text" generally refers to one or more letters or similar symbols that form words to provide information.

"Trailer" generally refers to an unpowered vehicle towed by another vehicle. For instance, a trailer can include a nonautomotive vehicle designed to be hauled by road, such as a vehicle configured to transport cargo, to serve as a temporary (or permanent) dwelling, and/or acting as a temporary place of business. Some non-limiting examples of trailers include open carts, semi-trailers, boat trailers, and mobile homes, to name a just few. Typically, trailers lack a power train for propelling themselves over long distances and require another powered vehicle to move them. However, trailers may include a power source, such as a battery or generator, for powering auxiliary equipment.

"Training" generally refers to the process of building a model based on given data. In the context of machine learning, training is used to teach artificial intelligence (AI) models information from a dataset and to make predictions. During training, models are given training data as input and output predictions for a target based on the given data. The models may be adjusted based on the outputs to improve the quality of predictions for the target. For example, a machine learning algorithm may adjust parameters of a model based on differences between the model output and information from the training data. The target of the model predictions may be included in information from the training data. Training may involve multiple iterations of models making predictions based on the data. In some cases, the training process is repeated or continued after a validation process.

"Training Data" generally refers to data that is used in the process of training models. Typically, training data is used for training artificial intelligence (AI) models. Training data may be a subset of a larger data set that is used for other parts of developing AI models. For example, one initial data set may be divided into testing data and training data for developing an AI model. Training data may include information that is used as input for a model and may include information about the expected output of a model. Training data may also include labels on data to better identify certain expected outputs. Models may be evaluated and adjusted based on labels or other information from the training data during the training process.

"Vehicle" generally refers to a machine that transports people and/or cargo. Common vehicle types can include land-based vehicles, amphibious vehicles, watercraft, aircraft, and space craft. By way of non-limiting examples, land-based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS 100 system
105 robot
110 operator device
115 material handling management system
120 network
125 robot arm
130 gantry style robotic vehicle
135 robotic shuttle
140 robotic mast vehicle
145 desktop computer
150 laptop computer
155 mobile device
160 AI system
200 robot station
205 robot workspace
210 conveyor
215 bins
220 item
225 controller
230 camera
235 sensor
240 base
245 arm
250 end effector
255 dropped item
260 difficult item
305 processor
310 memory
315 network interface
320 I/O device
405 processor
410 memory
415 network interface
420 I/O device
425 touchscreen
430 keyboard
500 rescue screen
505 text section
510 image section
600 rescue screen
605 text section
610 image section
615 stylus
705 processor
710 memory
715 network interface
720 long-term storage device
801 raw image
803 processed image
805 edge lines
810 surface
900 screen
905 trailer
910 diagram section
1000 flowchart
1005 stage
1010 stage
1015 stage
1020 stage
1025 stage
1100 flowchart
1105 stage
1110 stage
1115 stage
1120 stage
1125 stage
1200 image section
1205 pointer
1210 pick point
1215 coordinate icon
1300 image section
1400 flowchart
1405 stage
1410 stage
1415 stage
1420 stage
1425 stage
1500 image section
1600 flowchart
1605 stage
1610 stage
1615 stage
1620 stage
1625 stage

What is claimed is:

1. A system, comprising:
a robot configured to handle one or more items;
an operator device;
wherein the robot is configured to send an alert to the operator device in response to a fault by the robot in handling at least one of the items;
wherein the robot is configured to receive instructions from the operator device;
wherein the robot is configured to remedy the fault based on the instructions;
wherein the fault includes the robot dropping a dropped item on a floor; and
wherein the robot is configured to pick up the dropped item from the floor based on the instructions.

2. The system of claim 1, further comprising:
a camera configured to capture an image of the fault in handling the items by the robot; and
wherein the robot is configured to send the image of the fault to the operator device with the alert.

3. The system of claim 2, wherein:
the alert includes a web page;
the web page includes an image section that includes the image of the fault; and
the web page includes a text section with information about the fault.

4. The system of claim 2, wherein:
the operator device includes a display configured to display the image of the fault;
the operator device is configured to receive instructions from a human operator on how to remedy the fault; and
the operator device is configured to send the instruction to the robot.

5. The system of claim 4, wherein:
the display is a touchscreen; and
the touchscreen is configured to receive a touch-based input as to which of the items to handle with the robot.

6. The system of claim 5, wherein:
the alert includes an image section that includes the image of the fault;
the image section includes edge lines outlining edges of the items to demarcate surfaces of the items;
the touchscreen is configured to receive a touch-based input as to which surface of a difficult item to engage with the robot; and
the robot is configured to engage the surface of the difficult item that was designated in the instructions.

7. The system of claim 1, further comprising:
a network;
wherein the robot is operatively coupled to the network; and
wherein the operator device is operatively coupled to the network.

8. The system of claim 7, further comprising:
a material management system;
wherein the material management system is operatively coupled to the network;
wherein the material management system includes an Artificial Intelligence (AI) system; and
wherein the AI system enables the robot to recognize the items.

9. The system of claim 8, wherein:
the AI system is configured to recognize the items through machine learning;
the AI system is configured to determine edge lines of the items; and
the AI system is configured to determine surfaces of the items.

10. The system of claim 1, wherein the operator device is located at a remote location relative to the robot.

11. The system of claim 1, wherein:
the robot has a robot workspace; and
the operator device is located outside of the robot workspace.

12. The system of claim 1, wherein the robot is configured to load and/or unload the items from a trailer.

13. A method, comprising:
determining a fault in handling of one or more items has occurred at a robot with a controller;
capturing an image of the fault with a camera;
sending the image from the controller to an operator device;
displaying the image on the operator device;
receiving an instruction to remedy the fault from a human operator with the operator device;
sending the instruction from the operator device to the controller of the robot;
remedying the fault with the robot based on the instruction;
wherein the fault includes the robot dropping a dropped item on a floor; and
picking up the dropped item from the floor with the robot.

14. The method of claim 13, further comprising:
receiving a touch input on a touchscreen of the operator device at a location corresponding to a surface of the dropped item in the image.

15. The method of claim 13, further comprising:
receiving a touch input on a touchscreen display of the operator device at a location corresponding to a selected item in the image; and
handling the selected item with the robot.

* * * * *